United States Patent (12)
Isobe

(10) Patent No.: US 8,681,617 B2
(45) Date of Patent: Mar. 25, 2014

(54) COMMUNICATION DEVICE

(75) Inventor: Takashi Isobe, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/819,839

(22) PCT Filed: Mar. 1, 2012

(86) PCT No.: PCT/JP2012/055259
§ 371 (c)(1),
(2), (4) Date: Feb. 28, 2013

(87) PCT Pub. No.: WO2013/014962
PCT Pub. Date: Jan. 31, 2013

(65) Prior Publication Data
US 2013/0163422 A1    Jun. 27, 2013

(30) Foreign Application Priority Data
Jul. 26, 2011    (JP) ................. 2011-163047

(51) Int. Cl.
*G01R 31/08* (2006.01)

(52) U.S. Cl.
USPC ..................................... 370/230.1

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | | |
|---|---|---|---|---|
| 7,747,255 | B2 * | 6/2010 | Dacosta et al. | 455/452.2 |
| 2004/0190528 | A1 * | 9/2004 | Dacosta | 370/395.41 |
| 2005/0036495 | A1 * | 2/2005 | Wishneusky et al. | 370/395.4 |
| 2005/0063307 | A1 * | 3/2005 | Samuels et al. | 370/235 |
| 2005/0220115 | A1 * | 10/2005 | Romano et al. | 370/395.4 |
| 2009/0138775 | A1 * | 5/2009 | Christiaens et al. | 714/748 |
| 2009/0147676 | A1 | 6/2009 | Shimonishi | |
| 2010/0054123 | A1 * | 3/2010 | Yong | 370/230 |
| 2010/0103819 | A1 * | 4/2010 | Samuels et al. | 370/235 |
| 2010/0296466 | A1 * | 11/2010 | Mignot et al. | 370/329 |
| 2012/0189006 | A1 | 7/2012 | Isobe | |
| 2012/0321013 | A1 * | 12/2012 | Christiaens et al. | 375/295 |
| 2013/0003553 | A1 * | 1/2013 | Samuels et al. | 370/235 |

FOREIGN PATENT DOCUMENTS

| | | |
|---|---|---|
| JP | 10-4409 A | 1/1998 |
| JP | 2007-97144 A | 4/2007 |
| WO | 2011/033894 A1 | 3/2011 |
| WO | 2012/066824 A1 | 5/2012 |

* cited by examiner

*Primary Examiner* — Jung-Jen Liu
(74) *Attorney, Agent, or Firm* — Mattingly & Malur, PC

(57) ABSTRACT

A device in a line part from a LAN to a WAN includes a plurality of cards which includes a TCP converter relaying two TCP communications. The TCP converter exchanges the number of connections in which data transmission is in progress and the number of connections in which data reception is in progress between TCP converters, receives the total number of connections in which data reception is in progress in an opposite device and an access line bandwidth to a WAN from the opposite device for each TCP connection. A control bandwidth is determined on the basis of the retransmission ratio of data, the total number of connections in which data transmission is in progress and an access line bandwidth to the WAN, and the total number of connections in which data reception is in progress and an access line bandwidth to the WAN of which the opposite device notifies.

15 Claims, 28 Drawing Sheets

213

BANDWIDTH TABLE

| CONNECTION | BEFORE OLD REFERENCE TIME POINT | | BEFORE REFERENCE TIME POINT | | | REFERENCE TIME POINT | AFTER REFERENCE TIME POINT | | |
|---|---|---|---|---|---|---|---|---|---|
| | TRANS- MISSION BAND- WIDTH | CONTROL BAND- WIDTH | TRANS- MISSION BAND- WIDTH | RETRANS- MISSION BAND- WIDTH | CONTROL BAND- WIDTH | | TRANS- MISSION BIT INTE- GRATED VALUE | RETRANS- MISSION BIT INTE- GRATED VALUE | CONTROL BAND- WIDTH |
| 1 | 180 | 180 | 200 | 20 | 180 | 160 | 7608 | 0 | 190 |
| ⋮ | ⋮ | ⋮ | ⋮ | ⋮ | ⋮ | ⋮ | ⋮ | ⋮ | ⋮ |
| n | 200 | 200 | 220 | 0 | 220 | 220 | 11080 | 512 | 210 |

FIG.8

COMMUNICATION DEVICE

TECHNICAL FIELD

The present invention relates to a communication device, and, particularly to a communication device which controls a communication bandwidth between terminals.

BACKGROUND ART

A Wide Area Network (WAN) which employs an Internet Protocol-Virtual Private Network (IP-VPN) technique or the like is generally used as a communication network between bases, used for cloud computing or the like.

In a case where a terminal present in a certain base communicates with a terminal present in another base, the communication is performed via a line which connects a self-base LAN to a WAN and a line which connects the WAN to another base LAN. In these lines, an available bandwidth is restricted depending on contract bandwidths.

A TCP is generally used in communication between terminals. In the TCP communication, with respect to data which is transmitted by a transmission terminal, a reception terminal notifies of a position of the received data to the transmission terminal in a feedback manner. When the position of the received data of which the notification is sent in a feedback manner does not increase, the transmission terminal determines that discarding is detected.

In addition, the transmission terminal manages a parameter called a congestion window size (a size of data which can be transmitted even if a notification of reception thereof is not sent from the reception terminal) and varies the congestion window size depending on a round trip time (RTT) or whether or not discarding is detected.

It is determined that a network is congested when the RTT increases or discarding is detected, and a window size is reduced so as to indirectly reduce a transmission bandwidth, thereby preventing the network from being congested. In addition, it is determined that the network is vacant when the RTT decreases or there is no discarding, and the window size is increased so as to indirectly increase the transmission bandwidth, thereby effectively using a line bandwidth of the network.

As the RTT increases, the window size is hard to increase, and thus there are cases where bandwidths are unfairly assigned when communications having different RTT share a single line.

As above, the transmission bandwidth is greatly dependent on the RTT and a discarding rate in the communication using the TCP.

In addition to the RTT and the discarding detection, there is a technique of controlling a bandwidth through a combination of a transmission bandwidth in the past and a most recent retransmission bandwidth, or of controlling a bandwidth by using information of the number of connections exchanged between devices (PTL 1).

CITATION LIST

Patent Literature

[PTL 1] International Publication WO 2011/033894

SUMMARY OF INVENTION

Technical Problem

Since the transmission bandwidth is greatly dependent on the RTT and a discarding rate in the communication using the TCP, in circumstances such as a WAN in which the RTT is large, the number of hoppings is large, and thus there are many locations where discarding occurs, there are cases where only a transmission bandwidth which is greatly lower than a contract bandwidth is obtained. Further, a line bandwidth cannot be fairly assigned between a plurality of TCP communications.

The present invention has been made in light of the above-described problems, and an object thereof is to provide a communication device which prevents a transmission bandwidth from being greatly lower than a contract bandwidth in circumstances such as a WAN in which the RTT is large, the number of hoppings is large, and thus there are many locations where discarding occurs in the communication using the TCP.

Solution to Problem

In order to solve the problems, in an aspect of the present invention, a device which is provided in an access line part to a WAN from a LAN of each base includes a plurality of cards each of which includes a TCP converter relaying two TCP communications, wherein the TCP converter in the card includes means for relaying TCP communication between a terminal of a certain base and the device, TCP communication between two devices, and TCP communication between the device and a terminal of another base, means for exchanging information of the number of connections in which data transmission is in progress and the number of connections in which data reception is in progress between the plurality of TCP converters of the device, means for calculating a total number of the number of connections in which data transmission is in progress and the number of connections in which data reception is in progress, and means for notifying a TCP converter of an opposite device of information of a total number of the number of connections in which data reception is in progress and an access line bandwidth to the WAN for each TCP connection, wherein the TCP converter of the device connected to a reception side terminal includes means for notifying the TCP converter of a device connected to a transmission side terminal of a discarded location for each TCP connection in a feedback manner, wherein the TCP converter of the device connected to the transmission side terminal includes means for retransmitting the discarded location of which a notification is sent in a feedback manner, and wherein the card of the device connected to the transmission side terminal includes means for determining a control bandwidth on the basis of the most recent retransmission bandwidth, a transmission bandwidth prior thereto, a total number of the number of connections in which data transmission is in progress and an access line bandwidth to the WAN of the self device, and a total number of the number of connections in which data reception is in progress and an access line bandwidth to the WAN of which a notification is sent from the opposite device.

According to the aspect, a transmission bandwidth is not greatly dependent on an RTT and a discarding rate, and thereby an effective bandwidth is improved in circumstances such as a WAN in which the RTT is large, the number of hoppings is large, and thus there are many locations where discarding occurs. Further, a line bandwidth can be fairly assigned between a plurality of TCP communications.

According to the solving means of the present invention, there is provided a communication device comprising:
a plurality of cards each of which includes a TCP converter relaying TCP communication, wherein the TCP converter includes
an information exchanging unit that exchanges information of the number of TCP connections in which data transmission is in progress via the self TCP converter with other TCP converter of the self device, and
a bandwidth control unit that defines the maximum transmission bandwidth of each TCP communication,
the information exchanging unit calculates a total value of the number of TCP connections in which data transmission is in progress in the entire device on the basis of the information of the number of TCP connections exchanged with the other TCP converter, and
the bandwidth control unit defines the maximum transmission bandwidth of each TCP communication on the basis of the total value of the number of TCP connections in which data transmission is in progress in the entire device.

Advantageous Effects of Invention

It is possible, according to the present invention, to provide a communication device which prevents a transmission bandwidth from being greatly lower than a contract bandwidth in circumstances such as a WAN in which the RTT is large, the number of hoppings is large, and thus there are many locations where discarding occurs in the communication using the TCP.

BRIEF DESCRIPTION OF DRAWINGS

FIG. 8 This is a diagram illustrating a format of a bandwidth table 213.

DESCRIPTION OF EMBODIMENTS

The representative forms for implementing the present invention are as follows. A basic form is described in Embodiment 1, a form in which two WANs are relayed is described in Embodiment 2, and a form in which each TCP connection is weighted is described in Embodiment 3.

Embodiment 1

Figure 1:
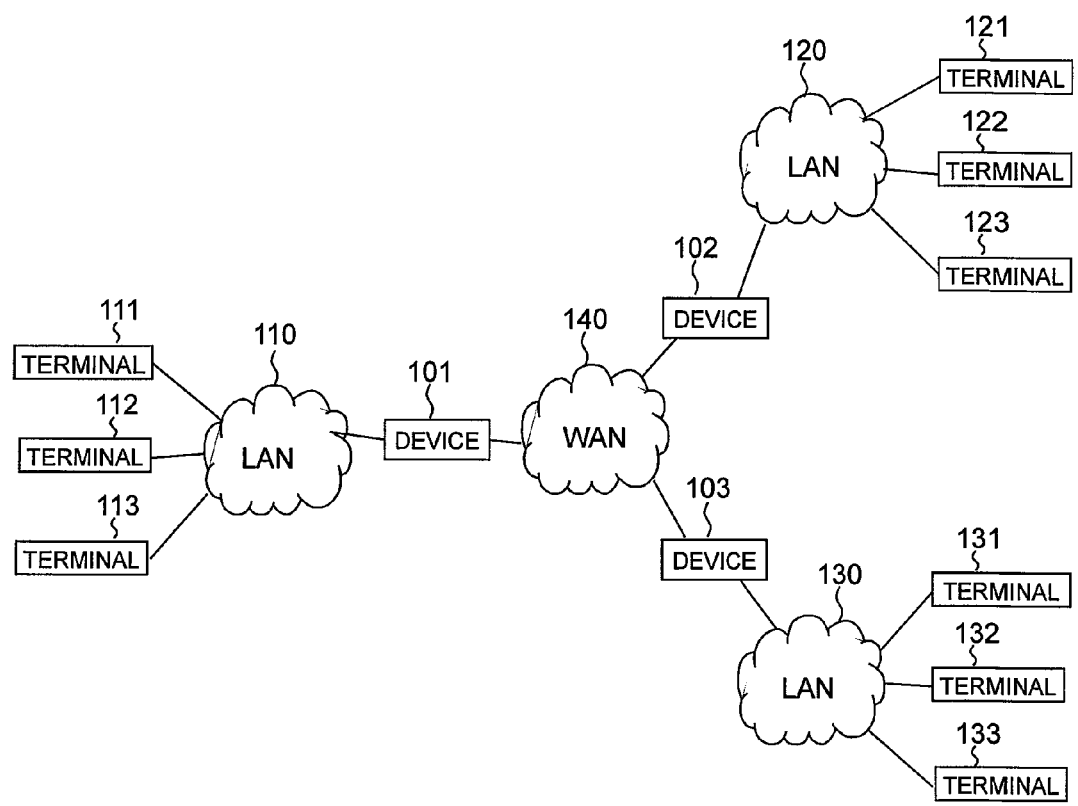
FIG. 1 This is a configuration diagram of a system including a device according to the present embodiment.

FIG. 1 is a configuration diagram of a relay system which employs a communication device according to the present embodiment.

Communication devices (also referred to as relay devices; hereinafter, simply referred to as devices) 101, 102 and 103 are provided on communication lines which connect LANs 110, 120 and 130 inside a plurality of bases to a WAN 140. A plurality of terminals 111 to 113, 121 to 123 and 131 to 133 are connected to the LANs 110, 120 and 130 inside the respective bases. Further, the number of the terminals, the devices, and the networks may be an appropriate number as well as the number shown in the figure.

The device 101 manages the number of transmission connections of TCP communication in which data transmission is in progress from the LAN 110 to the WAN 140, and a transmission access bandwidth of a line 141 from the LAN 110 and the WAN 140. In addition, the maximum value of a communication bandwidth per connection is limited such that a single TCP communication does not use too large a line bandwidth by the use of information of the number of transmission connections and the transmission access bandwidth, thereby securing fairness between the connections.

For example, if a transmission access bandwidth of the line 141 is 100 Mbps, and the number of transmission connections of the TCP communication is 10, the maximum value of a communication bandwidth per connection is limited to 10 Mbps, and bandwidth control of the TCP communication is performed.

The device 102 manages the number of reception connections of TCP communication in which reception of data toward the LAN 120 from the WAN 140 is in progress, and a reception access bandwidth of a line 142 from the WAN 140 to the LAN 120. Not only communication data from the device 101 but also communication data from the device 103 are input to the device 102. The device 102 notifies the device 101 and the device 103 of information of the number of reception connections and the reception access bandwidth managed by the self device. The device 101 limits the maximum value of a communication bandwidth per connection such that a single TCP communication does not use too large a bandwidth of the line 141 or the line 142 by using the information of the number of reception connections and the reception access bandwidth of the opposite device 102 as well as the information of the number of transmission connections and the transmission access bandwidth of the self device, thereby securing fairness between the connections.

For example, if the transmission access bandwidth of the line 141 is 100 Mbps, the reception access bandwidth of the line 142 is 40 Mbps, the number of transmission connections of the device 101 is 10, and the number of reception connections of the device 102 is 8, the maximum value of the communication bandwidth per connection in the line 141 is 10 Mbps, but the maximum value of the communication bandwidth per connection is 5 Mbps in the line 142. In this case, the device 101 limits the maximum value of the communication bandwidth per connection of the TCP communication toward the device 102 to the maximum value 5 Mbps of the line 142 which is smaller of the two, thereby realizing fairness between the connections in consideration of not only the line 141 connected to the self device but also the remote line 142. If the maximum value of the communication bandwidth per connection is limited to 10 Mbps only using the information of the self device, too large a bandwidth of the line 142 is used, and thus it is important to comprehensively limit a bandwidth by also using the information of the opposite device.

Figure 11:
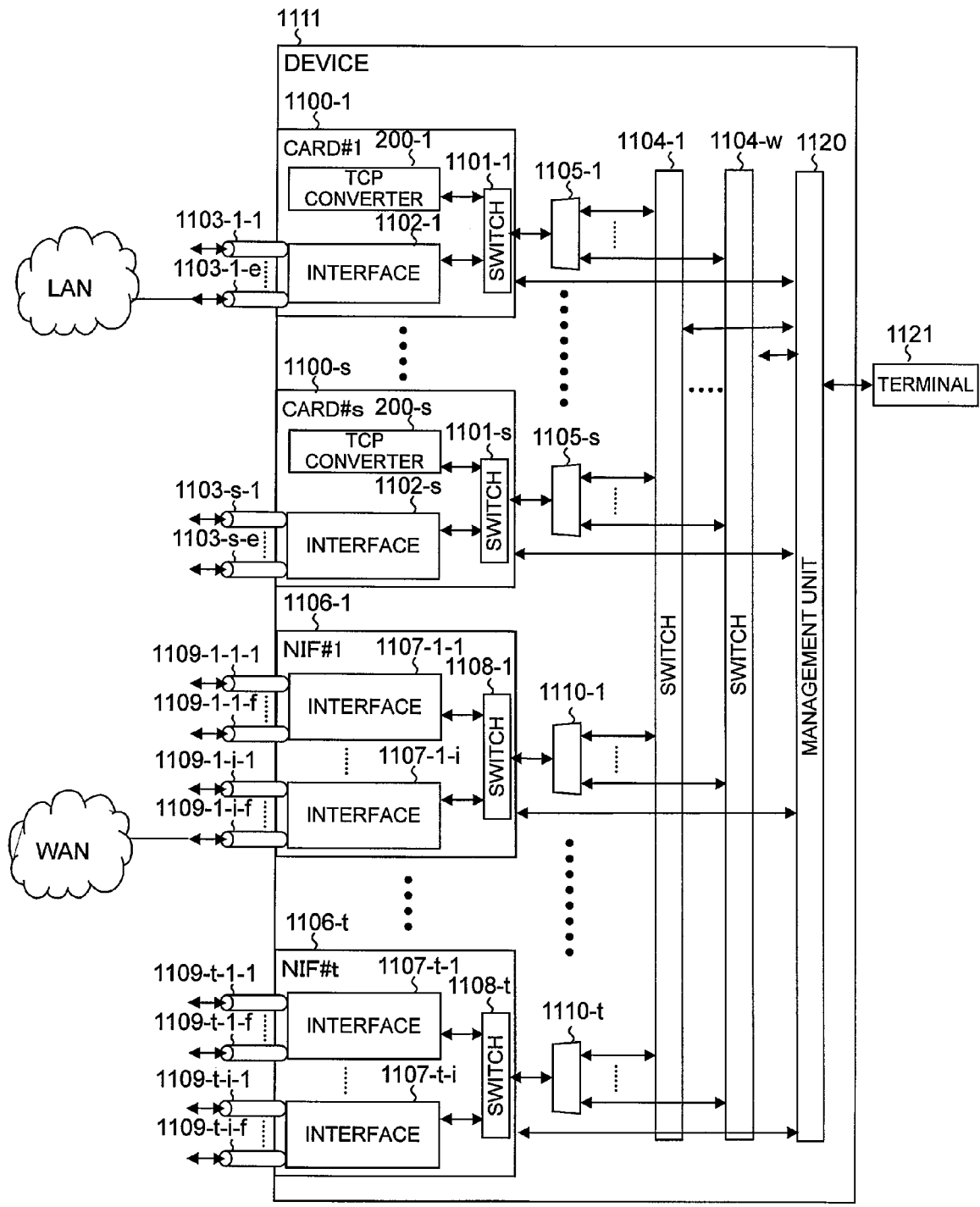
FIG. 11 This is a block diagram of a device 1111.

FIG. 11 is a block diagram illustrating a communication device 1111 according to the present embodiment. The communication device corresponds to the devices 101, 102 and 103.

The device 1111 includes one or a plurality of cards 1100-(1 to s), one or a plurality of network interfaces (NIFs) 1106-(1 to t), a plurality of switches 1104-(1 to w), connection units (1105-(1 to s) and 1110-(1 to t)) for exchanging data therebetween, and a management unit 1120 for managing the card 1100, the NIF 1106, and the switch 1104.

The cards 1100-(1 to s) include TCP converters 200-(1 to s) which relay the TCP communication, interfaces 1102-(1 to s) which accommodate a plurality of network lines 1103-(1 to s)-(1 to e) and perform transmission and reception of a packet, and switches 1101-(1 to s) which perform transmission and reception of a packet between the TCP converters 200-(1 to s), the interfaces 1102-(1 to s), and the connection units 1105-(1 to s).

The NIFs #1 to t (1106-(1 to t)) include a plurality of interfaces 1107-(1 to t)-(1 to i) which accommodate a plurality of network lines 1109-(1 to t)-(1 to i)-(1 to f) and perform transmission and reception of a packet, and switches 1108-(1 to t) which perform transmission and reception of a packet between the interfaces 1107-(1 to t)-(1 to i) and the connection units 1110-(1 to t).

The management unit 1120 is connected to a terminal (a management terminal) 1121, transmits and receives management information to and from the terminal 1121, and transmits internal information to the terminal 1121 so as to display the internal information on the terminal 1121.

In the device 1111, one or more of either the network lines 1103-(1 to s)-(1 to e) or the network lines 1109-(1 to t)-(1 to i)-(1 to f) are connected to the LAN, and one or more of either the network lines 1103-(1 to s)-(1 to e) or the network lines 1109-(1 to t)-(1 to i)-(1 to f) are connected to the WAN. A packet input to the device 1111 from the LAN is transferred to any one of the TCP converters 200 and is then output to the WAN. A packet input to the device 1111 from the WAN is transferred to any one of the TCP converters 200 and is then output to the LAN.

When a packet is received from the network lines 1103-(1 to s)-(1 to e) or the network lines 1109-(1 to t)-(1 to i)-(1 to f), the device 1111 determines whether or not the packet requires TCP conversion. For example, the determination may be performed based on header information of the packet. When it is determined that the packet requires the TCP conversion, the packet is transferred to the TCP converter 200. The packet which does not require the TCP conversion is transferred in the same manner as in a typical router or switch. The TCP converter 200 performs a relay process of the TCP communication on the transferred packet and transfers the packet in the same manner as a typical router or switch.

Figure 2:
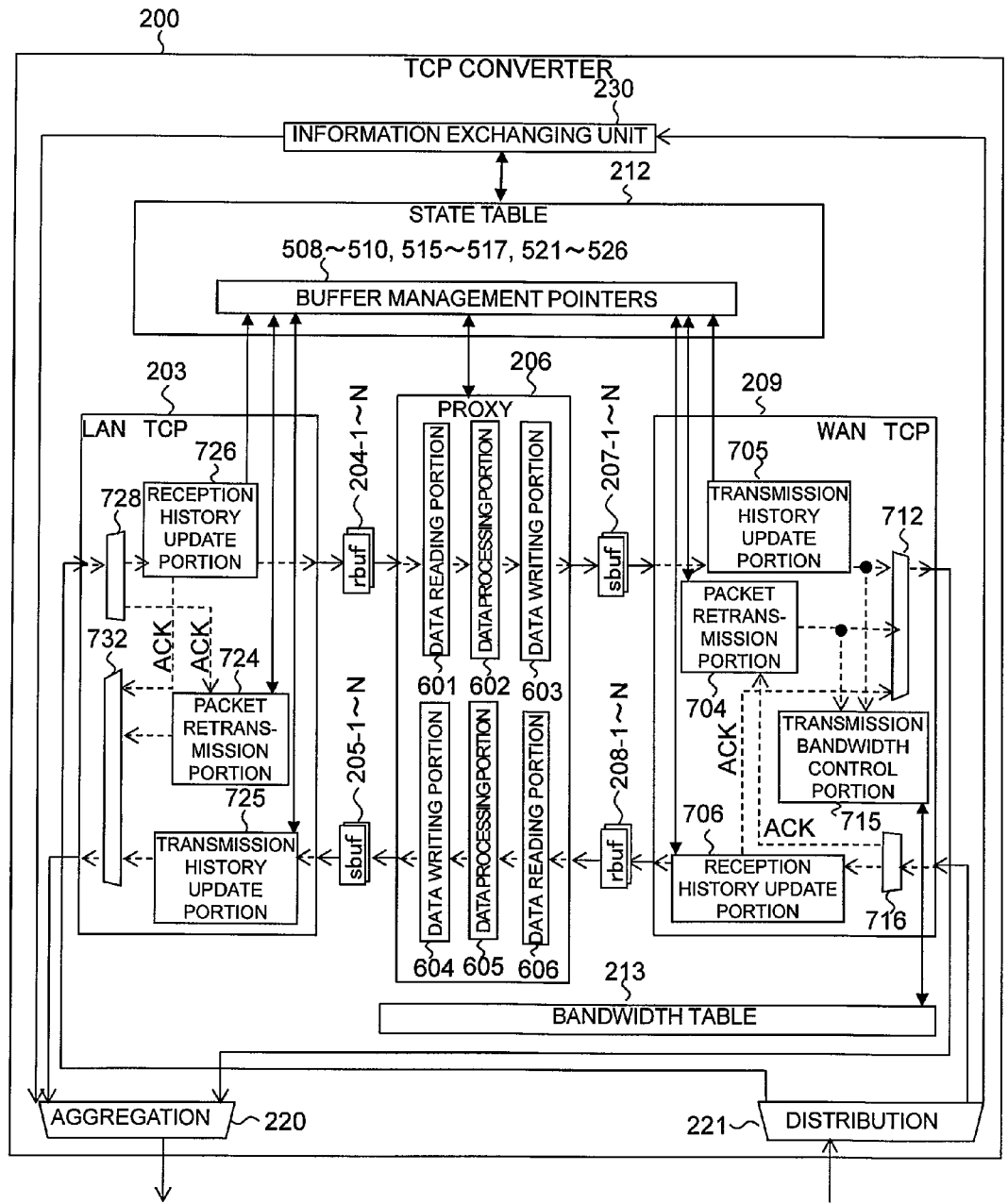
FIG. 2 This is a block diagram of a TCP converter 200 in a card 1100.

FIG. 2 is a block diagram of the TCP converter 200 which performs relay of the TCP communication.

The TCP converter 200 includes TCP processors 203 and 209 of the WAN side and the LAN side which perform control for TCP communication, N transmission buffers 207 and N reception buffers 208 managed by the TCP 209 of the WAN side, N transmission buffers 205 and N reception buffers 204 managed by the TCP 203 of the LAN side, a proxy 206 which replaces data between the transmission and reception buffers, a state table (state storage region) 212 having N entries, a bandwidth table 213 having N entries, an information exchanging unit 230 which exchanges information pieces of the number of connections in which data transmission is in progress or the number of connections in which data reception is in progress between the TCP converters 200 of the device 1111, a distribution unit 221 which distributes a packet to the TCP processor 209 of the WAN side, the TCP processor 203 of the LAN side, or the information exchanging unit 230, and an aggregation unit 220 which aggregates packets from the TCP processor 209 of the WAN side, the TCP processor 203 of the LAN side, or the information exchanging unit 230, and transfers the packets in the same manner as a typical router or switch. In addition, the above-described number N may be different.

The distribution unit 221 determines whether the transferred packet is a packet sent from the LAN side or the WAN side, transfers the packet sent from the LAN side to the TCP processor 203 of the LAN side, and transfers the packet sent from the WAN side to the TCP processor 209 of the WAN side. Whether a packet is sent from the LAN side or the WAN side may be determined, for example, using appropriate information inside the packet.

The TCP processors 203 and 209, and the proxy 206 will be described in detail later, and will be described briefly here.

The TCP processor 203 of the LAN side includes transmission history update portion 725, a packet retransmission portion 724, a reception history update portion 726, a distribution portion 728, and an aggregation portion 732. The reception history update portion 726 accumulates received packet data in the LAN side reception buffer 204. In addition, the reception history update portion 726 updates information of buffer management pointers (508 to 510, 515 to 517, and 521 to 526) of the state table 212 according to the size of accumulated data. Further, the reception history update portion 726 returns an ACK packet in which a position of the received data is described via the aggregation portion 732. The transmission history update portion 725 transmits transmission data read from the LAN side transmission buffer 205 as a packet, and updates information of the buffer management pointers (508 to 510, 515 to 517, and 521 to 526) of the state table 212 according to the size of the read transmission data.

The TCP processor 209 of the WAN side includes a transmission bandwidth control portion 715, a transmission history update portion 705, a packet retransmission portion 704, a reception history update portion 706, a distribution portion 708, and an aggregation portion 712. The reception history update portion 706 accumulates received packet data in the WAN side reception buffer 208. In addition, the reception history update portion 706 updates information of the buffer management pointers (508 to 510, 515 to 517, and 521 to 526) of the state table 212 according to the size of accumulated data. Further, the reception history update portion 706 returns an ACK packet in which a position of the received data is described via the aggregation portion 712. The transmission bandwidth control portion 715 accumulates information of measured transmission bandwidths (532 to 534) and retransmission bandwidths (530 and 531) in the state table 212. The transmission history update portion 705 transmits transmission data read from the WAN side transmission buffer 207 as a packet, and updates information of the buffer management pointers (508 to 510, 515 to 517, and 521 to 526) of the state table 212 according to the size of the read transmission data.

The proxy 206 includes data reading portions (601 and 606), data processing portions (602 and 605), and data writing portions (603 and 604). The data processing portions (602 and 605) accumulate information of a size (529 and 530) of data on which processing is in progress in the state table 212. The data reading portions (601 and 606) update information of the buffer management pointers (508 to 510, 515 to 517, and 521 to 526) of the state table 212 according to a data size read from the reception buffers (204 and 208). The data writing portions (603 and 604) update information of the buffer management pointers (508 to 510, 515 to 517, and 521 to 526) of the state table 212 according to a data size written in the transmission buffers (207 and 205).

Figure 3:
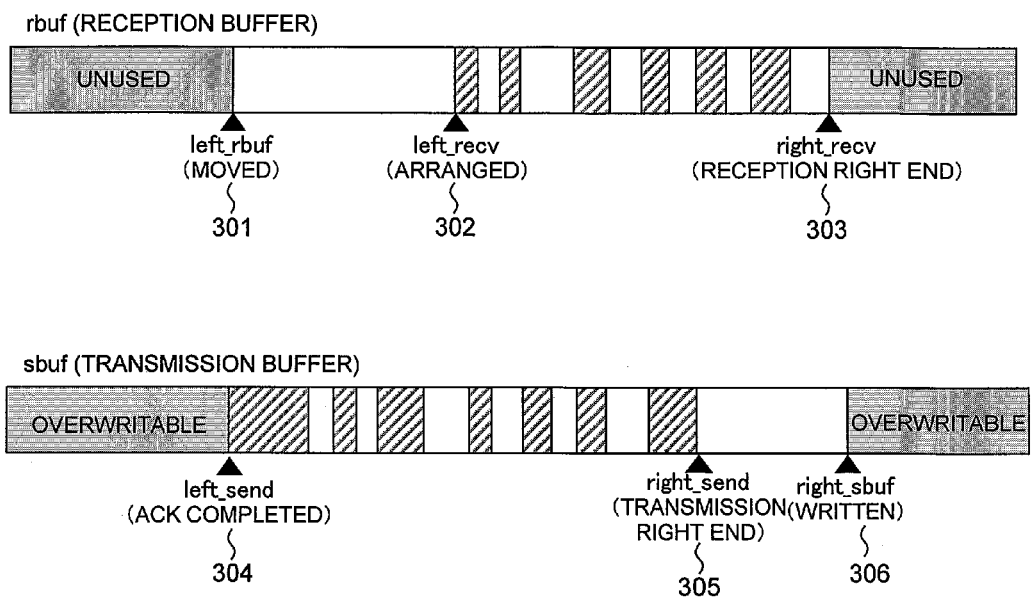
FIG. 3 This is a diagram illustrating pointers of a buffer.

FIG. 3 is a diagram illustrating pointers for managing the transmission and reception buffers. In this figure, it is assumed that data is written from the left to the right, and is read from the left to the right.

The reception buffer manages a pointer right_recv 303 indicating a head of received data, a pointer left_recv 302 indicating a boundary between arranged and unarranged data, and left_rbuf 301 indicating a boundary between data which has been read by the proxy 206 and data which has not been read.

The pointer right_recv 303 indicating a head of received data increases by the size of the received data and moves to the right when data is sequentially received from the front without a loss. If a retransmitted packet is received in a state in which there is a location (loss segment) of data which is not received and is omitted, and the loss segment disappears, the pointer left_recv 302 indicating a boundary between arranged data and unarranged data moves to the left end of the smallest loss segment. The proxy 206 sequentially reads data to the right from left_rbuf 301 indicating a boundary between data which has been read and data which has not been read, and moves left_rbuf 301 to the right by the size of the read data. The maximum value of the size of the read data is a difference between left_recv 302 and left_rbuf 301.

The transmission buffer manages a pointer right_sbuf 306 indicating a head of data which can be transmitted in a state of being written by the proxy 206, a pointer right_send 305 indicating a head of transmitted data, and a pointer left_send 304 indicating a head of data for which an acknowledgement has been received from a reception side.

The pointer right_sbuf 306 indicating a head of data which can be transmitted in a state of being written by the proxy 206 increases by the size of written data and moves to the right each time the proxy 206 writes data. When new data is transmitted to the right using the pointer right_send 305 indicating a head of transmitted data as a start point, right_send 305 increases by the size of the transmitted data and moves to the right. When an acknowledgement packet having a sequence number larger than left_send 304 is received from the reception side, left_send 304 increases to the received sequence number described in the acknowledgement packet and moves to the right.

Figure 4:
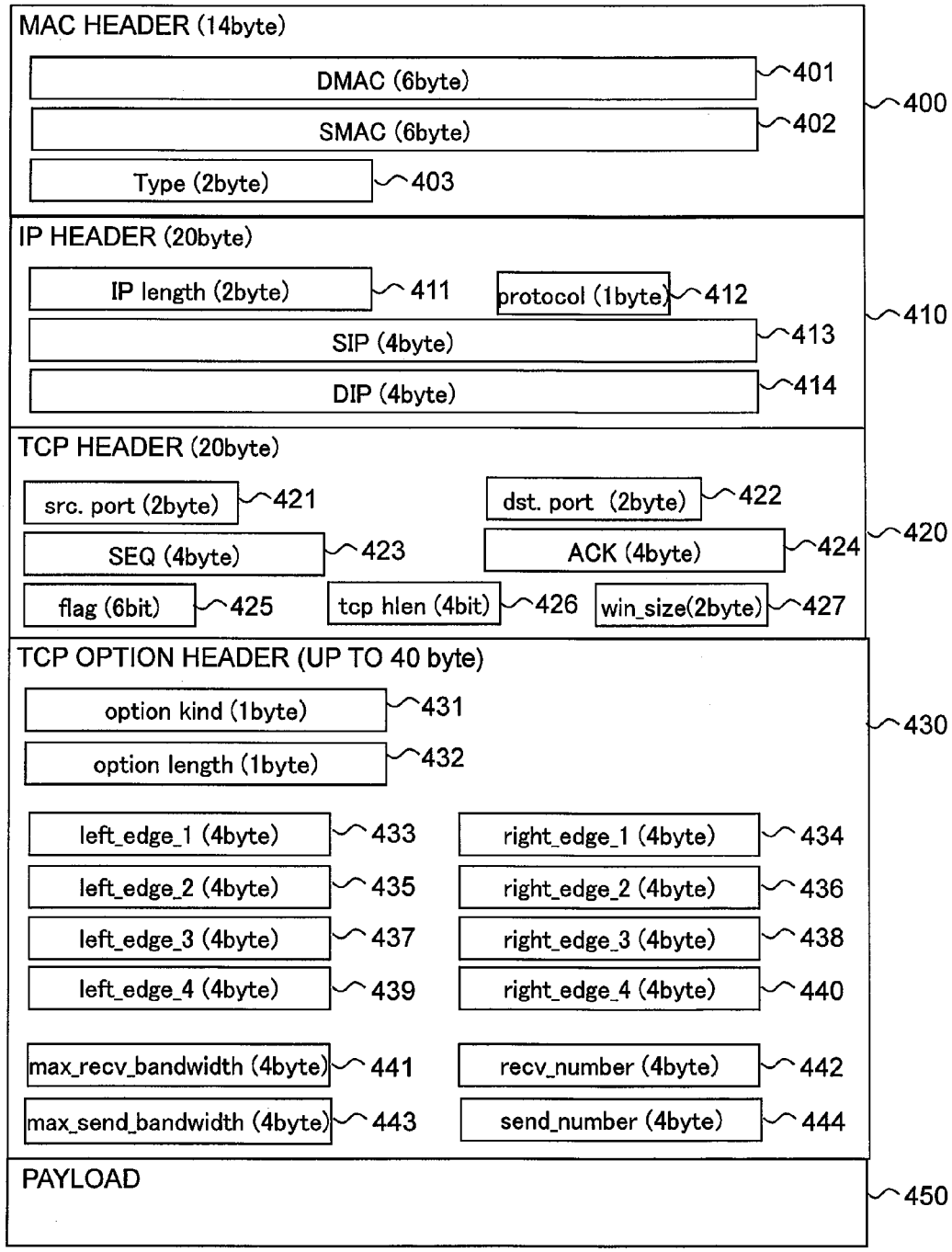
FIG. 4 This is a diagram illustrating a format of a packet.

FIG. 4 is a diagram illustrating a format of a packet which is sent and received by the device. The packet has a MAC header 400, an IP header 410, a TCP header 420, a TCP option header 430, and a payload 450. The MAC header 400 includes DMAC 401 indicating a destination MAC address, SMAC 402 indicating a transmission source MAC address, and Type 403 indicating a MAC frame type. In addition, the IP header 410 includes IP length 411 indicating a packet length excluding the MAC header, protocol 412 indicating a protocol number, SIP 413 indicating a transmission source IP address, and DIP 414 indicating a destination IP address. The TCP header 420 includes src.port 421 indicating a transmission source port number, dst.port 422 indicating a destination port number, SEQ 423 indicating a transmission sequence number, ACK 424 indicating a reception sequence number, flag 425 indicating a TCP flag number, and tcp hlen 426 indicating a header length of a TCP. The TCP option header 430 includes option kind 431 indicating the kind of option, option length 432 indicating an option length, and left_edge__1 to 4 (433, 435, 437, and 439) and right_edge__1 to 4 (434, 436, 438, and 440) describing which location can be partially received. There are cases where a part which cannot be received is described in left_edge__1 to 4 (433, 435, 437, and 439) and right_edge__1 to 4 (434, 436, 438, and 440). In addition, a transmission access line bandwidth max_send_bandwidth 443, a reception access line bandwidth max_recv_bandwidth 441, the number recv_number 442 of connections in which data reception is in progress, and the number send_number 444 of connections in which data transmission is in progress, may be described in the TCP option header 430, and may be used to exchange information between the devices or to exchange information between the TCP converters in the device.

Figure 5:
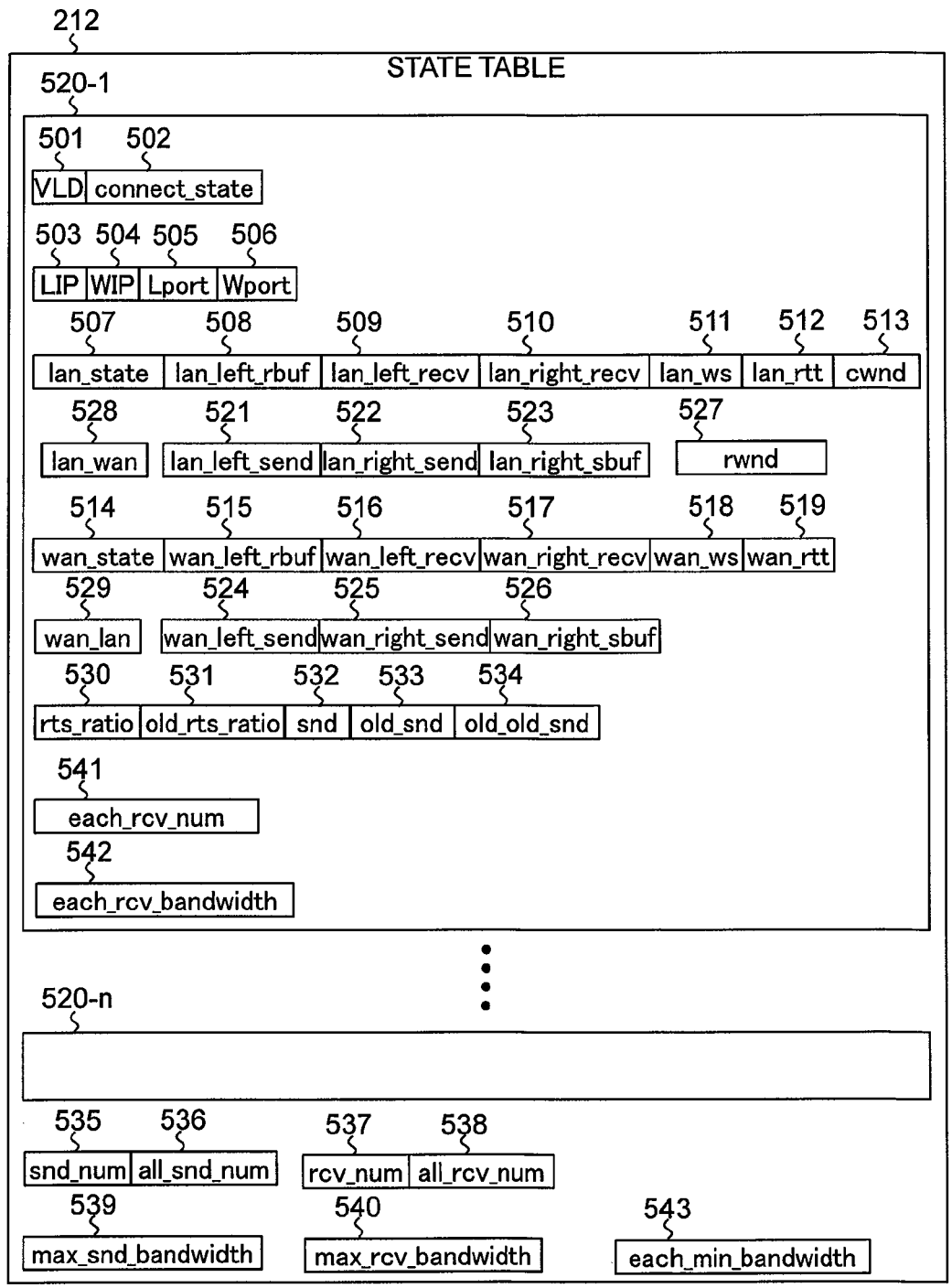
FIG. 5 This is a diagram illustrating a format of a state table 212.

FIG. 5 is a diagram illustrating a format of the state table 212.

The state table 212 of each TCP converter 200 includes, for example, n entries 520 for recording a state for each TCP connection, max_snd_bandwidth 539 for recording a transmission access line bandwidth of the device 1111, max_rcv_bandwidth 540 for recording a reception access line of the device 1111, all_snd_num 536 for recording the number of TCP connections in which transmission of all data items is in progress in the device 1111, all_rcv_num 538 for recording the number of TCP connections in which reception of all data items is in progress in the device 1111, snd_num 535 for recording the number of TCP connections in which transmission of data is in progress in each TCP converter 200, rcv_num 537 for recording the number of TCP connections in which reception of data is in progress in each TCP converter 200, and each_min_bandwidth 543 for recording the minimum bandwidth of each TCP connection.

Each entry 520 includes VLD 501 describing whether or not an entry is used, connect_state 502 describing whether or not a connection of the LAN side or the WAN side is established, LIP 503 indicating an IP address of a terminal of the LAN side, WIP 504 indicating an IP address of a terminal of the WAN side, Lport 505 indicating a TCP port number of a terminal of the LAN side, Wport 506 indicating a TCP port number of a terminal of the WAN side, lan_state 507 indicating a TCP communication state of the LAN side, lan_left_rbuf 508, lan_left_recv 509, and lan_right_recv 510 indicating pointers for managing the reception buffers of the LAN side, lan_ws 511 indicating a value of a window scale option of the LAN side, lan_rtt 512 indicating an average RTT of the LAN side, cwnd 513 indicating a congestion window size of the LAN side, lan_wan 528 indicating the size of data which is read from the reception buffer of the LAN side and on which processing is in progress, lan_left_send 521, lan_right_send 522, and lan_right_sbuf 523 indicating pointers for managing the transmission buffers of the LAN side, rwnd 527 indicating a reception window size of which a transmission terminal of the LAN side is notified, wan_state 514 indicating a TCP communication state of the WAN side, wan_left_rbuf 515, wan_left_recv 516, and wan_right_recv 517 indicating pointers for managing the reception buffers of the WAN side, wan_ws 518 indicating a value of a window scale option of the WAN side, wan_rtt 519 indicating an average RTT of the WAN side, wan_lan 529 indicating the size of data which is read from the reception buffer of the WAN side and on which processing is in progress, wan_left_send 524, wan_right_send 525, and wan_right_sbuf 526 indicating pointers for managing the transmission buffers of the WAN side, rts_ratio 530 indicating the most recent retransmission ratio of the WAN side, old_rts_ratio 531 indicating a retransmission ratio in the past of the WAN side, snd 532 indicating the most recent transmission bandwidth of the WAN side, old_snd 533 indicating a transmission bandwidth in the past of the WAN side, and old_old_snd 534 indicating a transmission bandwidth further in the past of the WAN side. In addition, each_rcv_num 541 for recording the number of connections in which data reception is in progress in the opposite device, and each_rcv_bandwidth 542 for recording a reception access line bandwidth of the opposite device are included.

each_rcv_num 541 and each_rcv_bandwidth 542 are updated based on information of which the opposite device notifies. For example, the packet retransmission portion 704 updates them for each TCP connection by using a value or the like described in the TCP option field of an ACK packet transmitted by the opposite device. each_rcv_num 541 and each_rcv_bandwidth 542 are received, for example, from an opposite device of the TCP communication corresponding to an associated entry.

max_snd_bandwidth 539, max_rcv_bandwidth 540, or the like is updated manually through the terminal 1121 or the like.

snd_num 535 or rcv_num 537 is updated by the information exchanging unit 230. The information exchanging unit 230 checks a buffer accumulation amount (a total of a difference between right_sbuf and left_send and a difference between right_recv and left_rbuf), for example, for each entry of the state table 212, and determines an entry in which data is accumulated in the transmission buffer as being a connection in which data transmission is in progress and determines an entry in which data is accumulated in the reception buffer as being a connection in which data reception is in progress, thereby performing calculation.

all_rcv_num 538 and all_snd_num 536 are updated based on information exchange with all the other TCP converters 200 in the device 1111. The information exchanging unit 230 of the TCP converter 200 notifies all the other TCP converters 200 of snd_num 535 or rcv_num 537 thereof, and calculates a total value of snd_num 535 or rcv_num 537 of which all the other TCP converters 200 notify, so as to obtain and periodically update all_rcv_num 538 and all_snd_num 536. The information exchanging unit 230 notifies an opposite device of the TCP communication of a total value all_rcv_num 538 of TCP connections in which data reception is in progress in the self device and the maximum reception bandwidth max_rcv_bandwidth 540 of connected lines.

Figure 6:
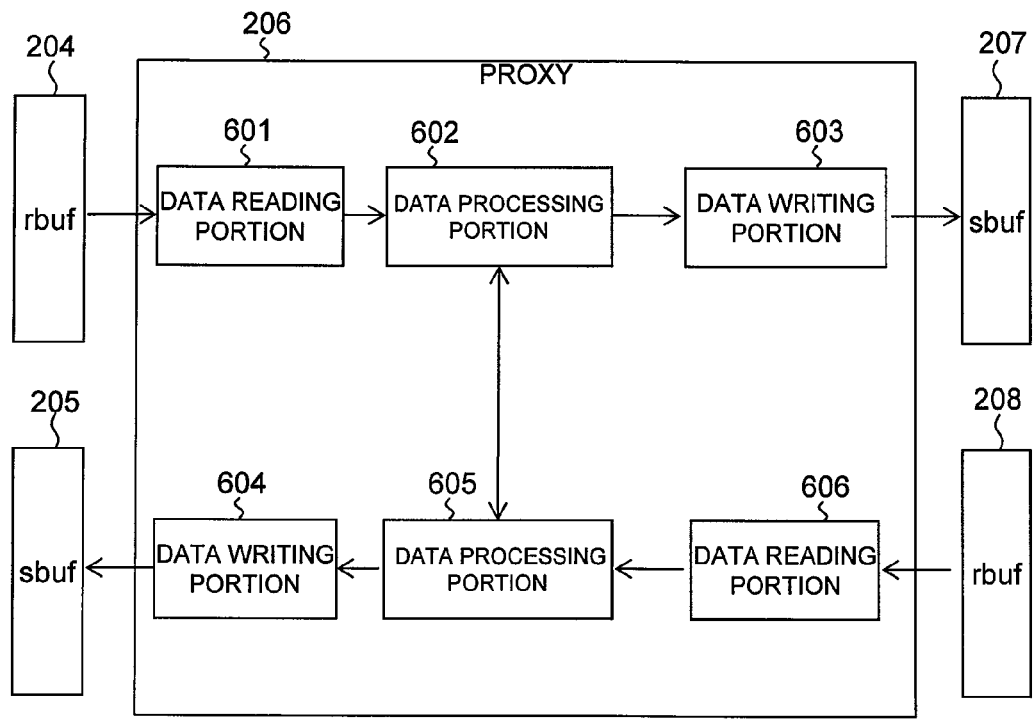
FIG. 6 This is a block diagram of a proxy unit 206.

FIG. 6 is a block diagram of the proxy 206.

The proxy 206 includes, for example, the data reading portion 601 which reads data from the reception buffer rbuf 204 of the LAN side, the data processing portion 602 which performs processings such as compression, decompression, encoding, decoding, deletion, copying, and appending, on the read data, the data writing portion 603 which writes the processed data in the transmission buffer sbuf 207 of the WAN side, the data reading portion 606 which reads data from the reception buffer rbuf 208 of the WAN side, the data processing portion 605 which performs processings such as compression, decompression, encoding, decoding, deletion, copying, and appending, on the read data, and the data writing portion 604 which writes the processed data in the transmission buffer sbuf 205 of the LAN side. Data may be exchanged between the data processing portion 602 and the data processing portion 605. Data processings other than the above-described example may be used.

The data reading portion 601 estimates the size of data to be read and the data size after data processing, from leading data read from arranged data which is accumulated between lan_left_rbuf 508 and lan_left_recv 509. As the leading data, a Transport Layer Security (TLS)/Secure Socket Layer (SSL) header, a Server Message Block (SMB) header, or the like may be used. From a value described in the TLS/SSL header, a checksum after decoding, or the data size of plaintext excluding the header can be estimated. From the SMB header, a command data size after a prefetch or the like is performed can be estimated. In a case where a difference between the estimated size of the processed data and wan_right_sbuf 526 and wan_left_send 524, that is, a sum of untransmitted data and a total of ACK awaiting data does not exceed the transmission buffer size wan_sbuf_size of the WAN side, data is read and is transferred to the data processing portion 602. Further, the larger size of the estimated size of data to be read and the data size after data processing is described in lan_wan 528 of the state table 212. Details thereof will be described later with reference to the flowchart diagram shown in FIG. 9.

The data reading portion 606 estimates the size of data to be read and the data size after data processing, from leading data read from arranged data which is accumulated between wan_left_rbuf 515 and wan_left_recv 516. As the leading data, a Transport Layer Security (TLS)/Secure Socket Layer (SSL) header, a Server Message Block (SMB) header, or the like may be used. In a case where a difference between the estimated size of the processed data and lan_right_sbuf 523 and lan_left_send 521, that is, a sum of untransmitted data and a total of ACK awaiting data does not exceed the transmission buffer size lan_sbuf_size of the LAN side, data is read and is transferred to the data processing portion 605. Further, the larger size of the estimated size of data to be read and the data size after data processing is described in wan_lan 529 of the state table 212. Details thereof will be described later with reference to the flowchart diagram shown in FIG. 10.

Figure 9:
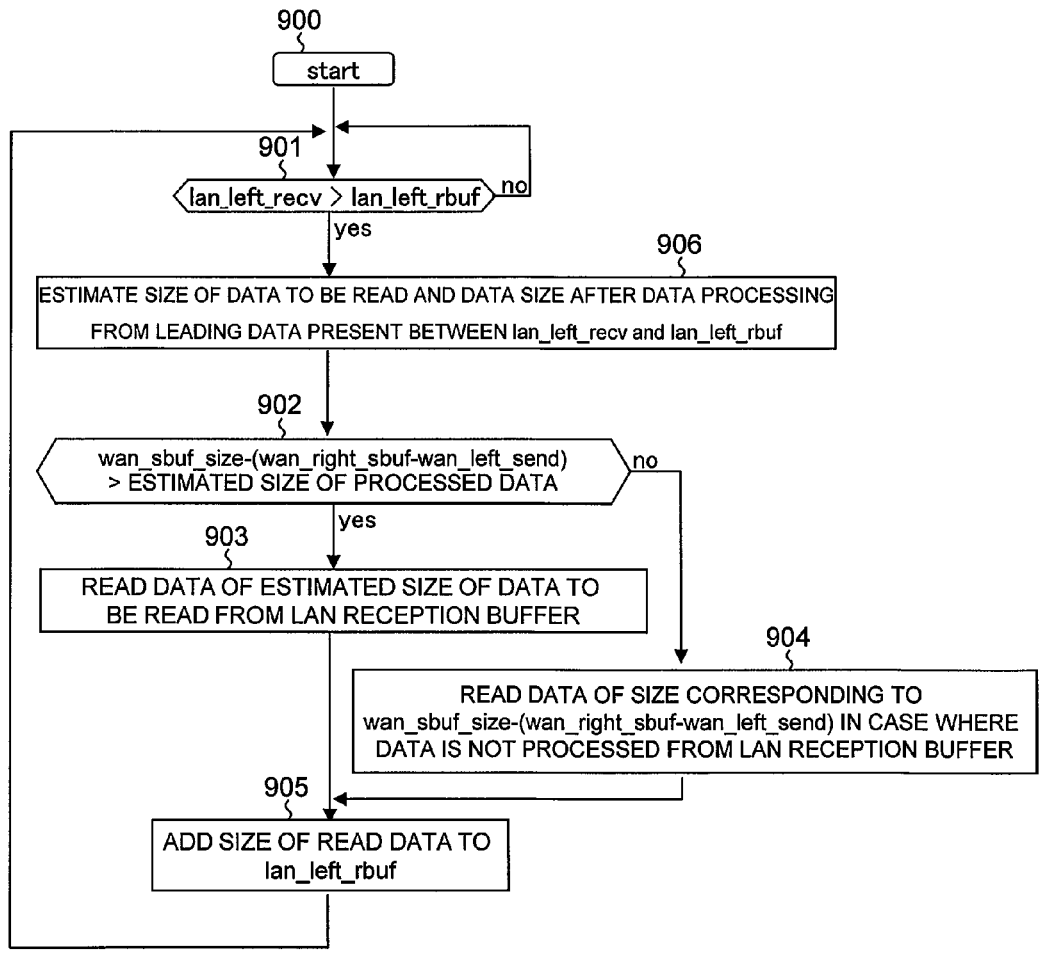
FIG. 9 This is a flowchart diagram illustrating a process in which the proxy unit 206 moves data of a LAN side reception buffer to a WAN side transmission buffer.
Figure 10:
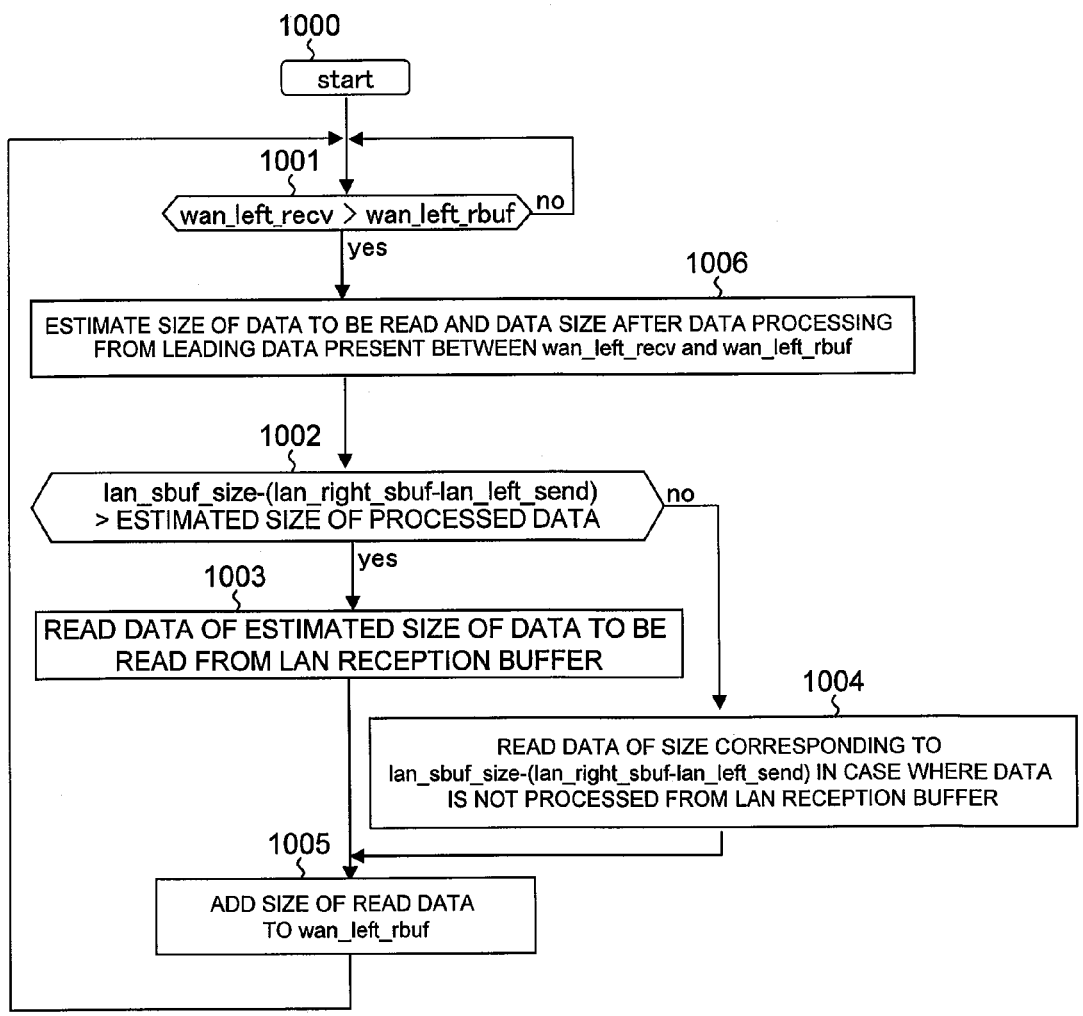
FIG. 10 This is a flowchart diagram illustrating a process in which the proxy unit 206 moves data of a WAN side reception buffer to a LAN side transmission buffer.

FIGS. 9 and 10 are respectively flowchart diagrams illustrating data reading processes by the data reading portion 601 and the data reading portion 606.

Each step of FIG. 9 is performed by the data reading portion 601.

When the process starts (step 900), first, the data reading portion 601 compares whether or not lan_left_recv 509 is larger than lan_left_rbuf 508 so as to determine whether or not there is arranged data in the reception buffer 204 of the LAN side (step 901). If it is determined that lan_left_recv 509 is not larger than lan_left_rbuf 508 in step 901, that is, there is no arranged data, step 901 is repeatedly performed. If it is determined that lan_left_recv 509 is larger than lan_left_rbuf 508 in step 901, that is, there is arranged data, then, the size of data to be read and the data size after data processing are estimated from leading data of arranged data present between lan_left_recv 509 and lan_left_rbuf 508 (step 906). As the leading data, a Transport Layer Security (TLS)/Secure Socket Layer (SSL) header, a Server Message Block (SMB) header, or the like may be used. Next, it is compared whether or not a difference (a vacant buffer size) between a difference (a total value of untransmitted data and ACK awaiting data) between wan_right_sbuf 526 and wan_left_send 524, and the transmission buffer size wan_sbuf_size of the WAN side is larger than the size of the processed data estimated in step 906 (step 902). If it is determined that the difference is larger than the processed data size in step 902, data of the size of data to be read, estimated in step 906, is read from the reception buffer 204 of the LAN side (step 903). If it is determined that the difference is not larger than the processed data size in step 902, data of a size corresponding to a difference (a vacant buffer size) between a difference (a total value of untransmitted data and ACK awaiting data) between wan_right_sbuf 526 and wan_left_send 524, and the transmission buffer size wan_sbuf_size of the WAN side is read from the reception buffer 204 of the LAN side only in a case where data is not processed (step 904). The read data is output to the data writing portion 603 via the data processing portion 602. After the data is read, the size of the read data is added to lan_left_rbuf 508 (step 905). After step 905, the flow returns to step 901. In addition, when the data writing portion 603 writes data, wan_right_sbuf 526 increases by the size of the written data.

Each step of FIG. 10 is performed by the data reading portion 606. When the process starts (step 1000), first, the data reading portion 606 compares whether or not wan_left_recv 516 is larger than wan_left_rbuf 515 so as to determine whether or not there is arranged data in the reception buffer 208 of the WAN side (step 1001). If it is determined that wan_left_recv 516 is not larger than wan_left_rbuf 515 in step 1001, that is, there is no arranged data, step 1001 is repeatedly performed. If it is determined that wan_left_recv 516 is larger than wan_left_rbuf 515 in step 1001, that is, there is arranged data, then, the size of data to be read and the data size after data processing are estimated from leading data of arranged data present between wan_left_recv 516 and wan_left_rbuf 515 (step 1006). As the leading data, a Transport Layer Security (TLS)/Secure Socket Layer (SSL) header, a Server Message Block (SMB) header, or the like may be used. Next, it is compared whether or not a difference (a vacant buffer size) between a difference (a total value of untransmitted data and ACK awaiting data) between lan_right_sbuf 523 and lan_left_send 521, and the transmission buffer size lan_sbuf_size of the LAN side is larger than the size of the processed data estimated in step 1006 (step 1002). If it is determined that the difference is larger than the processed data size in step 1002, data of the size of data to be read, estimated in step 1006, is read from the reception buffer 208 of the WAN side (step 1003). If it is determined that the difference is not larger than the processed data size in step 1002, data of a size corresponding to a difference (a vacant buffer size) between a difference (a total value of untransmitted data and ACK awaiting data) between lan_right_sbuf 523 and lan_left_send 521, and the transmission buffer size lan_sbuf_size of the LAN side is read from the reception buffer 208 of the WAN side only in a case where data is not processed (step 1004). The read data is output to the data writing portion 604 via the data processing portion 605 After the data is read, the size of the read data is added to wan_left_rbuf 515 (step 1005). After step 1005, the flow returns to step 1001. In addition, when the data writing portion 604 writes data, lan_right_sbuf 523 increases by the size of the written data.

Figure 7A:
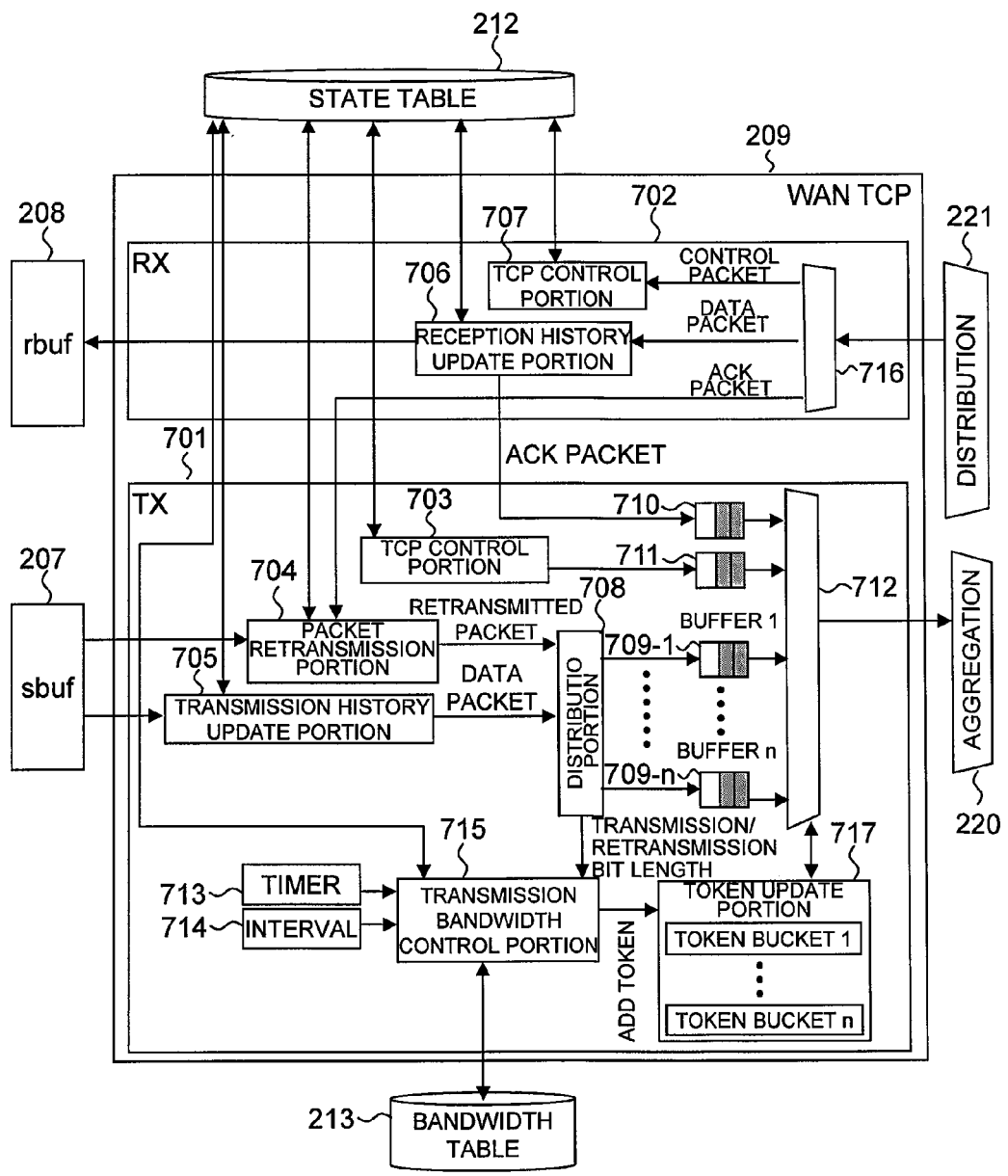
FIG. 7A This is a block diagram of a TCP unit 209.

FIG. 7A is a block diagram of the TCP processor 209 of the WAN side.

The TCP processor 209 which realizes TCP communication includes an RX unit (reception unit) 702 which performs a reception process and a TX unit (transmission unit) 701 which performs a transmission process.

The RX unit 702 includes a packet distribution portion 716 which divides a received packet into a TCP control packet, a packet with data, and an ACK packet, a TCP control portion 707 which changes TCP states lan_state 507 and wan_state 514 of the state table 212 on the basis of a received TCP control packet, and a reception history update portion 706 which changes the buffer management pointer of the state table 212 and returns an ACK packet on the basis of the transmission sequence number SEQ 423 and the reception sequence number ACK 424 of a received data packet.

The TX unit 701 includes a TCP control portion 703 which transmits a TCP control packet by using the TCP states lan_state 507 and wan_state 514 of the state table 212, a packet retransmission portion 704 which changes the buffer management pointer of the state table 212 on the basis of a received ACK packet, reads data from the transmission buffer sbuf 207 by using partial acknowledgements left_edge_1 to 4 (433, 435, 436, and 439) and right_edge_1 to 4 (434, 436, 438, and 440) described in the received ACK packet, and retransmits a packet, the transmission history update portion 705 which transmits a packet carrying data read from the transmission buffer sbuf 207 therein and changes the buffer management pointer of the state table 212, a distribution portion 708 which receives a retransmitted packet and a data packet which are distributed to buffers 1 to n (709-1 to 709-n), and notifies the transmission bandwidth control portion 715 of transmission/retransmission bit length of each TCP connection, a timer 713 which generates a current time point of which the transmission bandwidth control portion 715 is notified, an interval storage portion 714 which preserves an interval time (a fixed value determined in advance, a measured RTT, or the like) of which the transmission bandwidth control portion 715 is notified, the transmission bandwidth control portion 715 which controls the bandwidth table 213 and notifies a token update portion of a token size of each TCP connection, the token update portion 717 which manages a token bucket for each TCP connection and notifies a multiplexer 712 of transmittable connection, and the multiplexer 712 and buffers 709 to 711 which aggregate and output an ACK packet, a TCP control packet, a retransmitted packet, and a data packet in a FIFO manner.

In the present embodiment, among the respective blocks of the TX unit 701, the blocks (for example, the token update portion 717, the multiplexer 712, the buffer 709, and the like) which transmit data according to a control bandwidth (the maximum transmission bandwidth) of each TCP communication are collectively referred to as a transmission control portion.

Figure 7B:
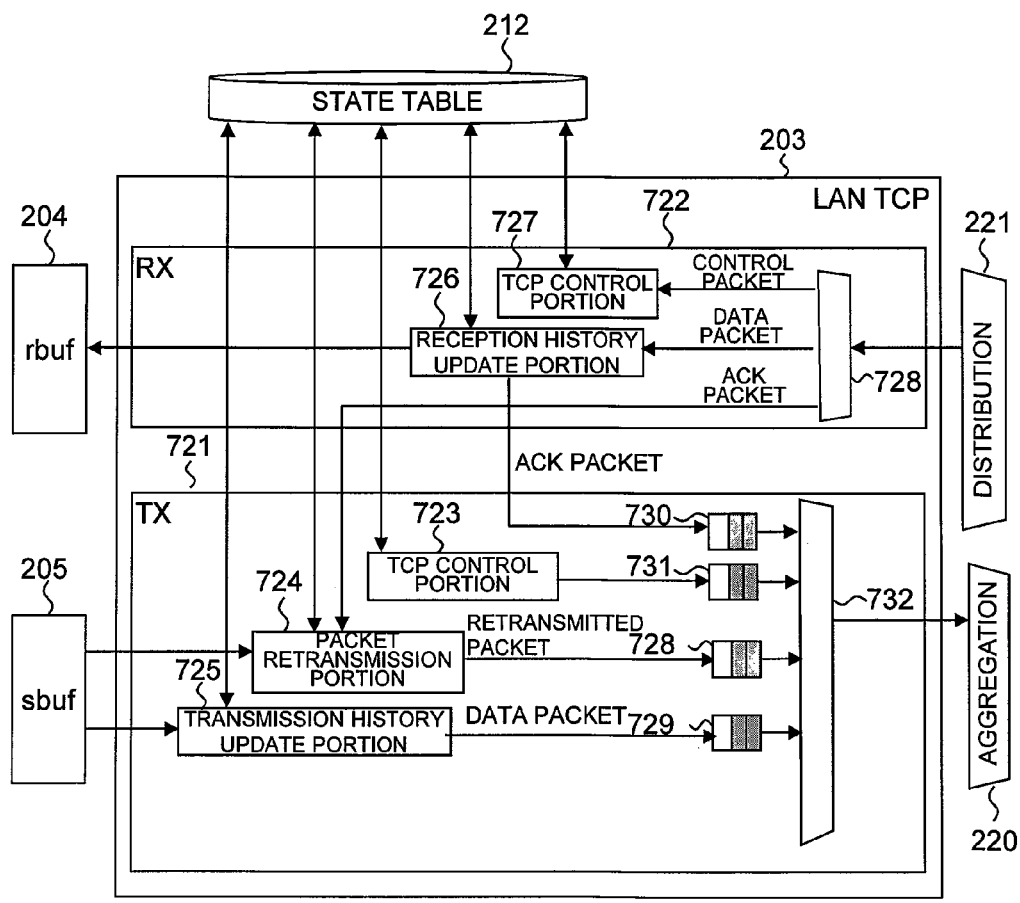
FIG. 7B This is a block diagram of a TCP unit 203.

FIG. 7B is a block diagram of the TCP processor 203 of the LAN side.

The TCP processor 203 which realizes TCP communication includes an RX unit (reception unit) 722 which performs a reception process and a TX unit (transmission unit) 721 which performs a transmission process. The RX unit 722 includes a packet distribution portion 728 which divides a received packet into a TCP control packet, a packet with data, and an ACK packet, a TCP control portion 727 which changes TCP states lan_state 507 and wan_state 514 of the state table 212 on the basis of a received TCP control packet, and the reception history update portion 726 which changes the buffer management pointer of the state table 212 and returns an ACK packet on the basis of the transmission sequence number SEQ 423 and the reception sequence number ACK 424 of a received data packet.

The TX unit 721 includes a TCP control portion 723 which transmits a TCP control packet by using the TCP states lan_state 507 and wan_state 514 of the state table 212, a packet retransmission portion 724 which changes the buffer management pointer of the state table 212 on the basis of a received ACK packet, reads data from the transmission buffer sbuf 205 by using partial acknowledgements left_edge_1 to 4 (433, 435, 436, and 439) and right_edge_1 to 4 (434, 436, 438, and 440) described in the received ACK packet, and retransmits a packet, a transmission history update portion 725 which transmits a packet carrying data read from the transmission buffer sbuf 205 therein and changes the buffer management pointer of the state table 212, and a multiplexer 732 and buffers 729 to 731 which aggregate and output an ACK packet, a TCP control packet, a retransmitted packet, and a data packet in a FIFO manner.

The transmission bandwidth control portion 715 of the WAN side TCP processor 209 manages an internal variable such as a reference time point. If a difference between a reference time point and a current time point of the timer 713 is larger than an interval time of the interval storage portion 714, the interval time is added to the reference time point so as to be set as a new reference time point. The reference time point before the addition becomes an old reference time point. In other words, a reference time point which is used one step before a reference time point which is currently used becomes an old reference time point.

FIG. 8 shows a format of the bandwidth table 213 managed by the transmission bandwidth control portion 715.

The bandwidth table 213 records, for each connection, a reference time point, a transmission bit integrated value, a retransmission bit integrated value, and a control bandwidth after a reference time point, a transmission bandwidth, a retransmission bandwidth, and a control bandwidth before a reference time point, and, a transmission bandwidth and a control bandwidth before an old reference time point.

The control bandwidth after the reference time point indicates a control bandwidth (indicated by a token in the present embodiment) at a current time point. The transmission bandwidth after the reference time point indicates a transmission bandwidth (indicated by snd in the present embodiment) at a current time point and is obtained by dividing the transmission bit integrated value after the reference time point by a difference between the current time point and the reference time point. The retransmission bandwidth after the reference time point indicates a retransmission bandwidth (indicated by its in the present embodiment) at a current time point and is obtained by dividing the retransmission bit integrated value after the reference time point by a difference between the current time point and the reference time point. The control bandwidth, the transmission bandwidth, and the retransmission bandwidth before the reference time point indicate average values of a control bandwidth, a transmission bandwidth, and a retransmission bandwidth (indicated by old_token, old_snd, and old_rts in the present embodiment) from the old reference time point to the reference time point. The control bandwidth and the transmission bandwidth before the old reference time point indicate a control bandwidth and a transmission bandwidth (indicated by old_old_token and old_old_snd in the present embodiment) until right before the old reference time point. The retransmission ratio old_rts_ratio before the reference time point is obtained by old_rts/old_old_snd. In addition, the current retransmission ratio rts_ratio after the reference time point is obtained by its/old_snd. There are cases where wan_rtt 519 described in the state table 212 is used as the interval time.

Figure 12:
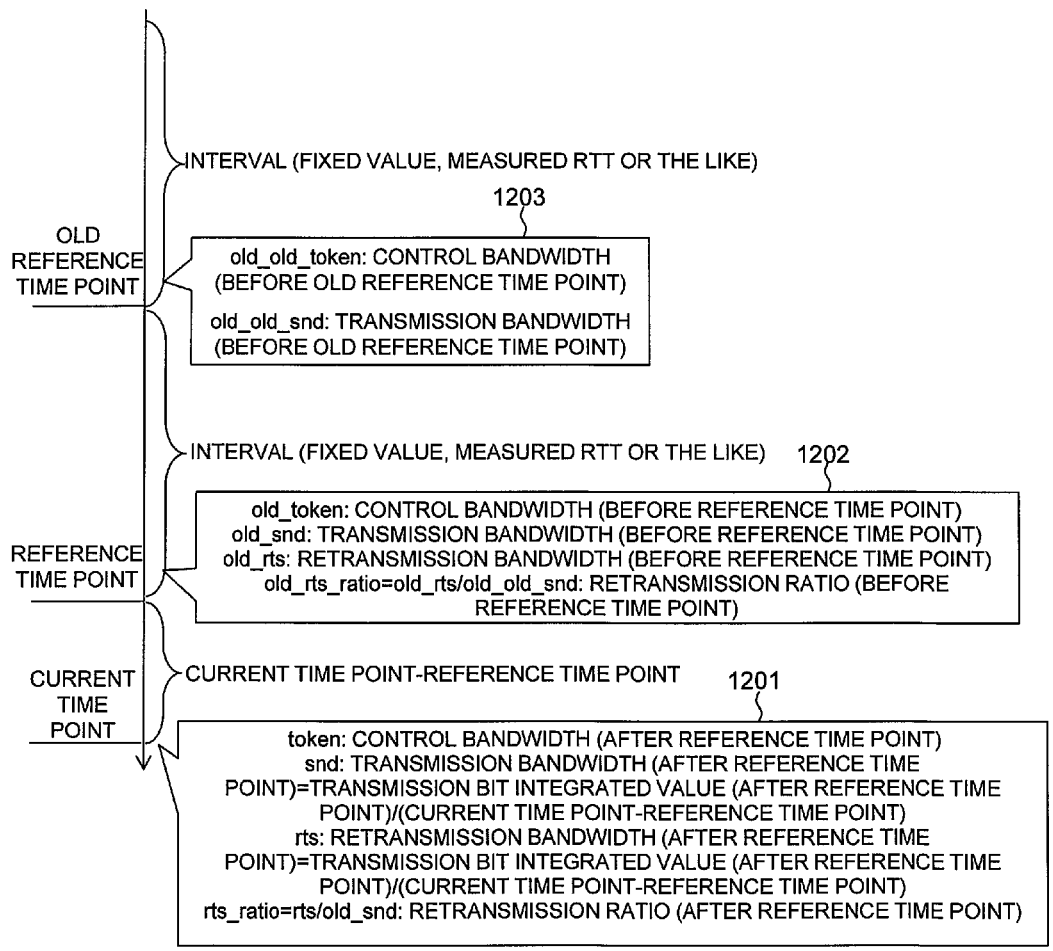
FIG. 12 This is a conceptual diagram illustrating meanings of values held by the bandwidth table 213.

FIG. 12 shows a relationship between an old reference time point, a reference time point, and a current time point, and a control bandwidth, a transmission bandwidth, and a retransmission bandwidth before and after them.

A difference between the old reference time point and the reference time point corresponds to an interval time. Average values of a control bandwidth and a transmission bandwidth in an interval time of the old reference time point are respectively indicated by old_old_token and old_old_snd (1203). Average values of a control bandwidth, a transmission bandwidth, and a retransmission bandwidth from the old reference time point to the reference time point are respectively indicated by old_token, old_snd, and old_rts (1202). Average values of a control bandwidth, a transmission bandwidth, and a retransmission bandwidth from the reference time point to the current time point are respectively indicated by token, snd, and its (1201).

The transmission bandwidth control portion 715 calculates rts_ratio 530 and old_rts_ratio 531 by using the values described in the bandwidth table 213 so as to determine a control bandwidth (token) which is sent to the token update portion 717. In addition, the state table 212 is updated.

With reference to FIG. 2, a description will be made of a flow of a packet when a packet with data is received from the LAN side.

A packet with data which arrives from the LAN side enters the LAN side TCP processor 203 and arrives at the reception history update portion 726. The reception history update portion 726 returns an ACK packet to the LAN side via the aggregation unit 732 and accumulates the data described in the packet in the LAN side reception buffer rbuf 204. In addition, the pointer of the state table 212 is updated based on the size of the accumulated data. The data reading portion 601 reads arranged data which is accumulated in the LAN side reception buffer rbuf 204 so as to be transferred to the data processing portion 602. In addition, the pointer of the state table 212 is updated based on the size of the read data. The data processing portion 602 processes data which is transferred to the data writing portion 603. Further, the size of data on which processing is in progress of the state table 212 is updated based on the size of the data on which processing is in progress. The data writing portion 603 writes the processed data in the WAN side transmission buffer sbuf 207. In addition, the pointer of the state table 212 is updated based on the size of the written data. The data written in the WAN side transmission buffer sbuf 207 is read by the transmission history update portion 705 and is transmitted to the WAN side as a packet with data.

In a further description of the reception history update portion 726, the reception history update portion calculates a remaining capacity of the reception buffer by subtracting a difference between lan_right_recv 510 and lan_left_rbuf 508 from the maximum value of the LAN side reception buffer. When the size of the payload 450 is equal to or less than the remaining capacity of the reception buffer, all data items described in the payload 450 are stored in the reception buffer. When the size of the payload 450 is larger than the remaining capacity of the reception buffer, only data items corresponding to the remaining capacity of the reception buffer from the head of the payload 450 are stored in the reception buffer. When an input data size is larger than 0, the pointer for managing the reception buffer is updated based on a value of SEQ 423 described in the TCP header 420 of the packet with data and the input data size. For example, in a case where a value obtained by adding the input data size to SEQ 423 described in the packet header is larger than lan_right_recv 510, lan_right_recv 510 is changed to the value obtained by adding the input data size to SEQ 423. Further, the received data is stored in the LAN side reception buffer such that the end of the received data is located at lan_right_recv 510. Successively, the reception window size rwnd 527 is described in win_size 427 of the TCP header 420, and an ACK packet in which lan_left_recv 509 which is one of the reception buffer management pointers is described in ACK 424 of the TCP header 420 is returned to the LAN side.

In addition, in the reception history update portion 726, a value of rwnd 527 is not used in determining whether or not data is stored. For this reason, when a remaining capacity of the reception buffer is larger than 0 even if rwnd 527 is 0, data described in the payload 450 is stored in the reception buffer, and an ACK packet which has incremented ACK 424 is returned to the LAN side.

In a further description of the transmission history update portion 705, the transmission history update portion reads data from wan_right_send 525 up to wan_right_sbuf 526 in the right direction from the WAN side transmission buffer sbuf 207. Here, wan_right_send 525 increases by the size of the read data and moves to the right. In addition, the read data is described in the payload 450, and a packet with data to which the TCP header 420 in which wan_right_send 525 is described in SEQ 423 is added is transmitted to the WAN side.

(Update Process of Control Bandwidth)

Separately from the update process of a control bandwidth, information notification and reception with the other information exchanging units of the self device, and information notification and reception with the information exchanging units of the opposite device are performed by the information exchanging unit 230 as described above, so as to update each information piece of the state table 212.

Figure 13A:
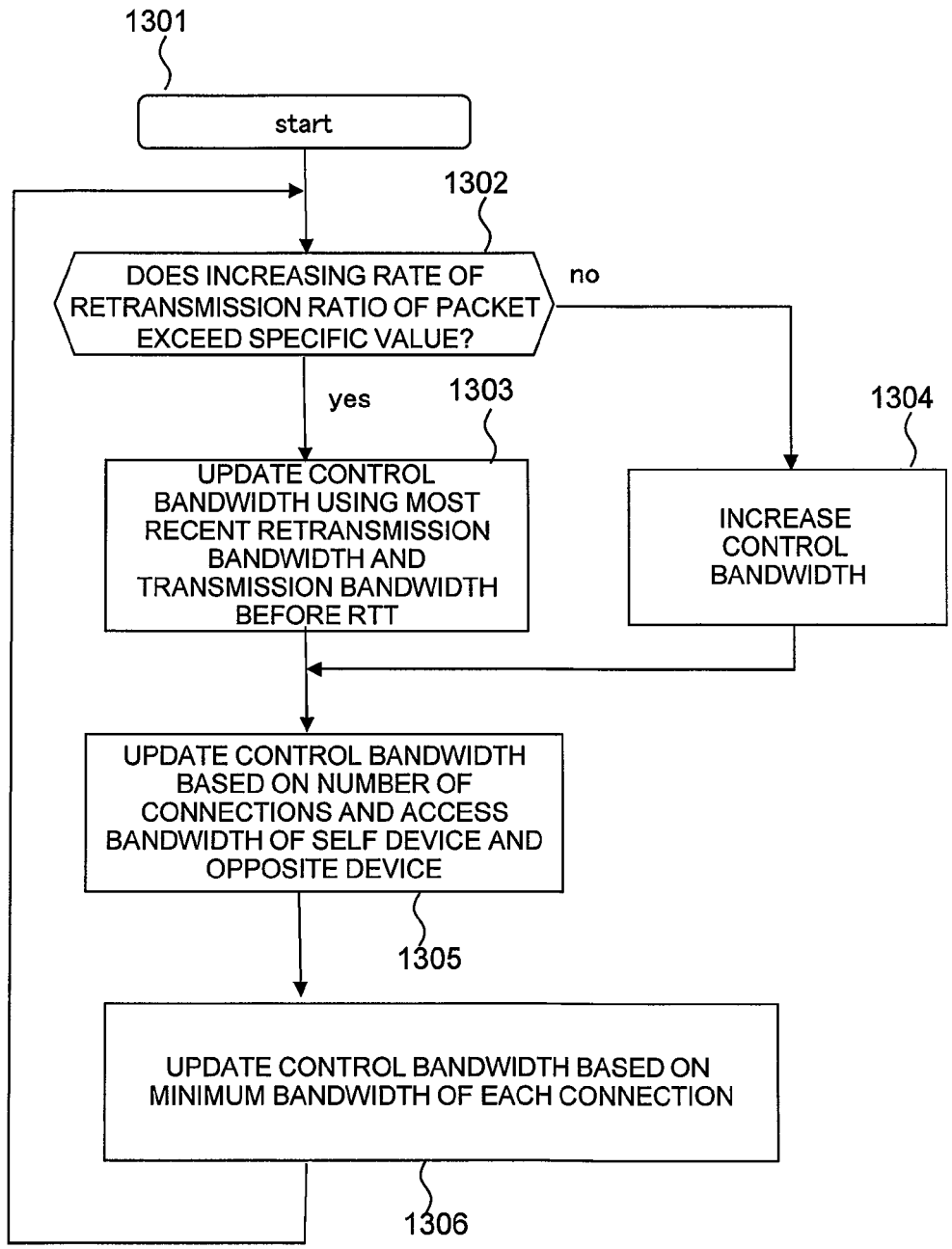
FIG. 13A This is a flowchart diagram (1) illustrating that a control bandwidth is updated using a rate of change of a retransmission ratio, the number of connections of a self device and an opposite device, and an access bandwidth.

FIG. 13A is a conceptual flowchart diagram when the transmission bandwidth control portion 715 updates a control bandwidth (token). When the transmission bandwidth control portion 715 performs processes according to this flowchart, it is possible to more fairly limit a bandwidth and to realize bandwidth control based on a retransmission ratio by using not only a bandwidth per connection of the self device obtained from a transmission access line bandwidth of the self device and the number of connections in which data transmission is in progress, but also a bandwidth per connection of the opposite device obtained from a reception access line bandwidth of which the opposite device notifies and the number of connections in which data reception is in progress. Each step of FIG. 13A is performed by the transmission bandwidth control portion 715.

When the update process of a control bandwidth starts (step 1301), the transmission bandwidth control portion 715 determines whether or not an increasing rate of a packet retransmission ratio (=rts/old_token or rts/old_snd) exceeds a specific value (a predefined threshold value) (step 1302). If the increasing rate exceeds the specific value, the control bandwidth (token) is updated using the current retransmission bandwidth (rts) and the old (before the reference time point) control bandwidth (old_token) or the old (before the reference time point) transmission bandwidth (old_snd) (step 1303). For example, a control bandwidth before the reference time point is reduced by an amount corresponding to the current retransmission bandwidth so as to be set as a control bandwidth of a current time point. On the other hand, if the increasing rate does not exceed the specific value, the control bandwidth increases (step 1304). After step 1303 or step 1304, the control bandwidth (token) is updated based on the number of connections and the access bandwidth of the self device and the number of connections and the access bandwidth of the opposite device (step 1305). Finally, the control bandwidth (token) is updated based on the minimum bandwidth (each_min_bandwidth 543) of each connection (step 1306). The control bandwidth (token) is changed so as to change an amount of tokens accumulated in a token bucket, and thereby a transmission rate of a packet can be changed.

Figure 13B:
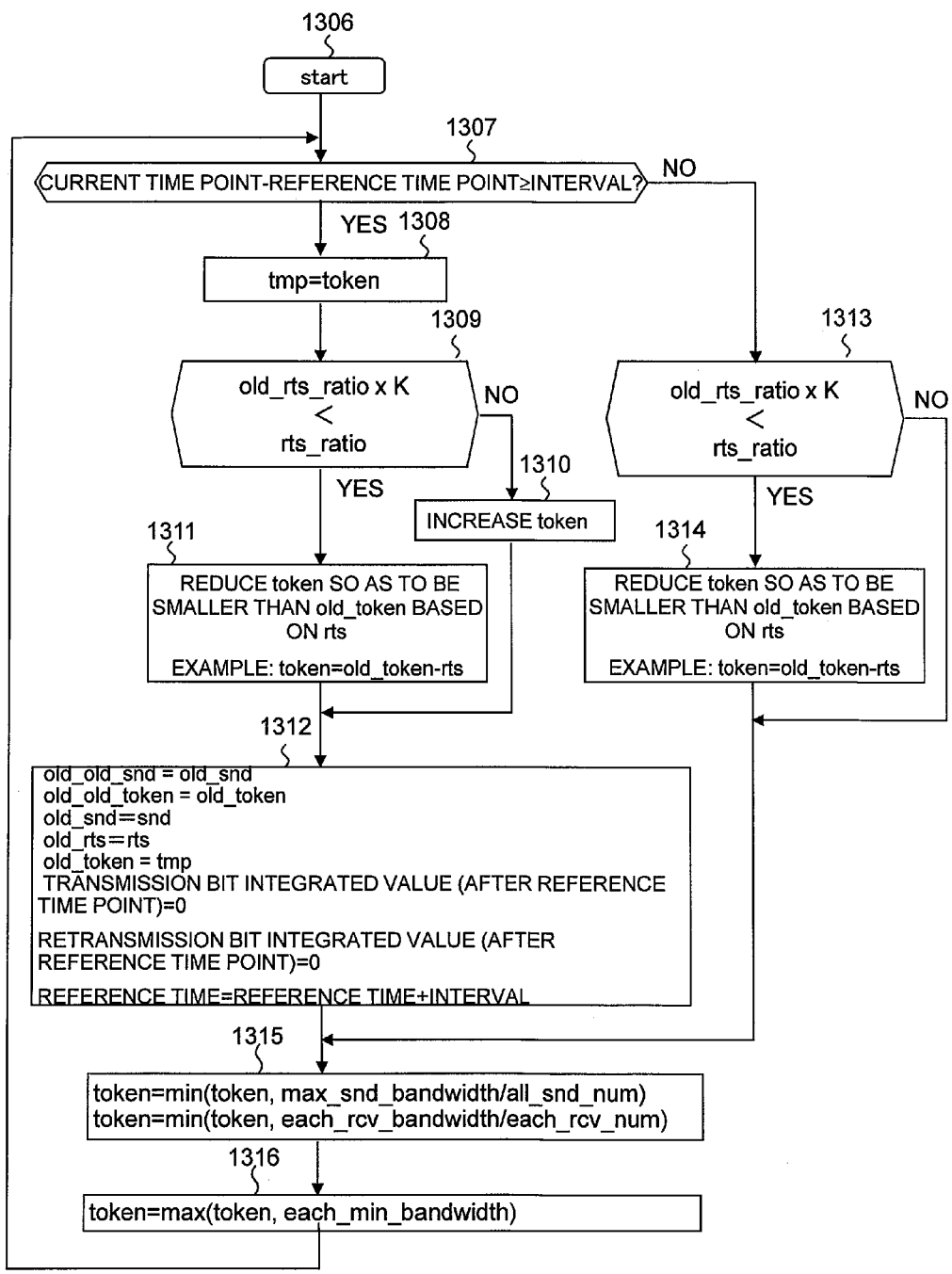
FIG. 13B This is a flowchart diagram (2) illustrating that a control bandwidth is updated using a rate of change of a retransmission ratio, the number of connections of a self device and an opposite device, and an access bandwidth.

FIG. 13B is a flowchart diagram illustrating that the transmission bandwidth control portion 715 changes a control bandwidth (token) using values described in the bandwidth table 213. FIG. 13B shows a more detailed example of FIG. 13A. Each step of FIG. 13B is performed by the transmission bandwidth control portion 715.

When the update process of the control bandwidth (token) starts (step 1306), the transmission bandwidth control portion 715 determines whether or not a difference between a current time point output by the timer 713 and a reference time point described in the bandwidth table 213 is equal to or more than an interval time output by the interval storage portion 714 (step 1307). As the interval time, wan_rtt 519 describing an average value or an initial value of a measured RTT, or the like, may be used. If it is determined that step 1307 is true, a value of the current control bandwidth token after the reference time point is set to tmp (step 1308). In addition, for example, it is determined whether or not a retransmission ratio (after the reference time point) rts_ratio obtained by retransmission bit integrated value (after the reference time point)/(the current time point−the reference time point)/transmission bandwidth (before the reference time point) stored in the bandwidth table 213 is larger than K (where K is a predefined coefficient equal to or more than 1) times larger than an old retransmission ratio (before the reference time point) old_rts_ratio obtained by retransmission bandwidth (before the reference time point)/transmission bandwidth (before the reference time point) (step 1309). It corresponds to above-described step 1302. A value of K may be fixed or varies depending on a value of token. If it is determined that the retransmission ratio is larger than K times larger than the old retransmission ratio in step 1309, it is determined that an increasing rate of the retransmission ratio is large, and a value of the control bandwidth (after the reference time point) token is reduced, for example, using the retransmission bandwidth rts, so as to be smaller than a value of the control bandwidth (before the reference time point) old_token. For example, the control bandwidth (after the reference time point) token is set to the control bandwidth (before the reference time point) old_token—the retransmission bandwidth (after the reference time point) rts (step 1311). If it is determined that step 1309 is false, the control bandwidth (after the reference time point) token increases (step 1310). As a method of increasing the control bandwidth (after the reference time point) token, the control bandwidth may increase linearly, exponentially, through a combination of linear increase and exponential increase, or initially increase linearly and then increase exponentially, or an increasing rate may vary depending on the control bandwidth (after the reference time point) token.

When step 1311 or step 1310 is completed, for example, the transmission bandwidth (before old reference time point) old_old_snd is updated to the transmission bandwidth (before the reference time point) old_snd, the transmission bandwidth (before the reference time point) old_snd is updated to the transmission bandwidth (after the reference time point) snd, the retransmission bandwidth (before the reference time point) old_rts is updated to the retransmission bandwidth (after the reference time point) rts, the reference time point is updated to the reference time point+an interval, the transmission bit integrated value (after the reference time point) is set to 0, the retransmission bit integrated value (after the reference time point) is set to 0, the control bandwidth (before the old reference time point) old_old_token is updated to the control bandwidth (before the reference time point) old_token, and the control bandwidth (before the reference time point) old_token is set to tmp. The respective values are recorded in the bandwidth table 213 (step 1312). Successively, the flow proceeds to step 1315.

On the other hand, if it is determined that step 1307 is false, in the same manner as in step 1309, it is determined whether or not a retransmission ratio (after the reference time point) rts_ratio obtained by retransmission bit integrated value (after the reference time point)/(the current time point–the reference time point)/transmission bandwidth (before the reference time point) is larger than K (where K is a predefined coefficient equal to or more than 1) times larger than an old retransmission ratio (before the reference time point) old_rts_ratio obtained by retransmission bandwidth (before the reference time point)/transmission bandwidth (before the old reference time point) (step 1313). A value of K may be fixed or may vary depending on a value of token. If it is determined that the retransmission ratio is larger than K times larger than the old retransmission ratio in step 1313, it is determined that a rate of change of the retransmission ratio is large, and, in the same manner as in step 1311, a value of the control bandwidth (after the reference time point) token is reduced using the retransmission bandwidth rts, so as to be smaller than a value of the control bandwidth (before the reference time point) old_token. For example, the control bandwidth (after the reference time point) token is set to the control bandwidth (before the reference time point) old_token—the retransmission bandwidth (after the reference time point) rts (step 1314). If it is determined that the retransmission ratio is smaller than or equal to K times larger than the old retransmission ratio in step 1313, no process is performed. Through these steps, even if the interval time has not elapsed, an increase in the retransmission ratio can be immediately detected, thereby updating a control bandwidth. Therefore, the flow proceeds to step 1315.

In step 1315, if the control bandwidth (after the reference time point) token is larger than a transmission access line bandwidth per connection obtained by dividing the transmission access line bandwidth max_snd_bandwidth 539 of the device 1111 by the number all_snd_num 536 of TCP connections in which data transmission is in progress in the device 1111, the control bandwidth (after the reference time point) token is changed to the transmission access line bandwidth per connection. Further, if the control bandwidth (after the reference time point) token is larger than a reception access line bandwidth per connection obtained by dividing the reception access line bandwidth each_rcv_bandwidth 542 of the opposite device by the number each_rcv_num 541 of TCP connections in which data reception is in progress in the opposite device, the control bandwidth (after the reference time point) token is changed to the reception access line bandwidth per connection (step 1315). In addition, if the control bandwidth (after the reference time point) token is smaller than the minimum bandwidth each_min_bandwidth of each TCP communication, the control bandwidth (after the reference time point) token is changed to the minimum bandwidth each_min_bandwidth of each TCP communication (step 1316). In other words, the smaller one of tokens defined by the two expressions shown in FIG. 13B is taken. In addition, each data item in steps 1315 and 1316 may be read by referring to the state table 212. The control bandwidth (token) is changed so as to change an amount of tokens accumulated in a token bucket, and thereby a transmission rate of a packet can be changed.

As above, it is possible to more fairly limit a bandwidth and to realize bandwidth control based on a retransmission ratio by using not only a bandwidth per connection of the self device obtained from a transmission access line bandwidth of the self device and the number of connections in which data transmission is in progress, but also a bandwidth per connection of the opposite device obtained from a reception access line bandwidth of which the opposite device notifies and the number of connections in which data reception is in progress.

Figure 22:
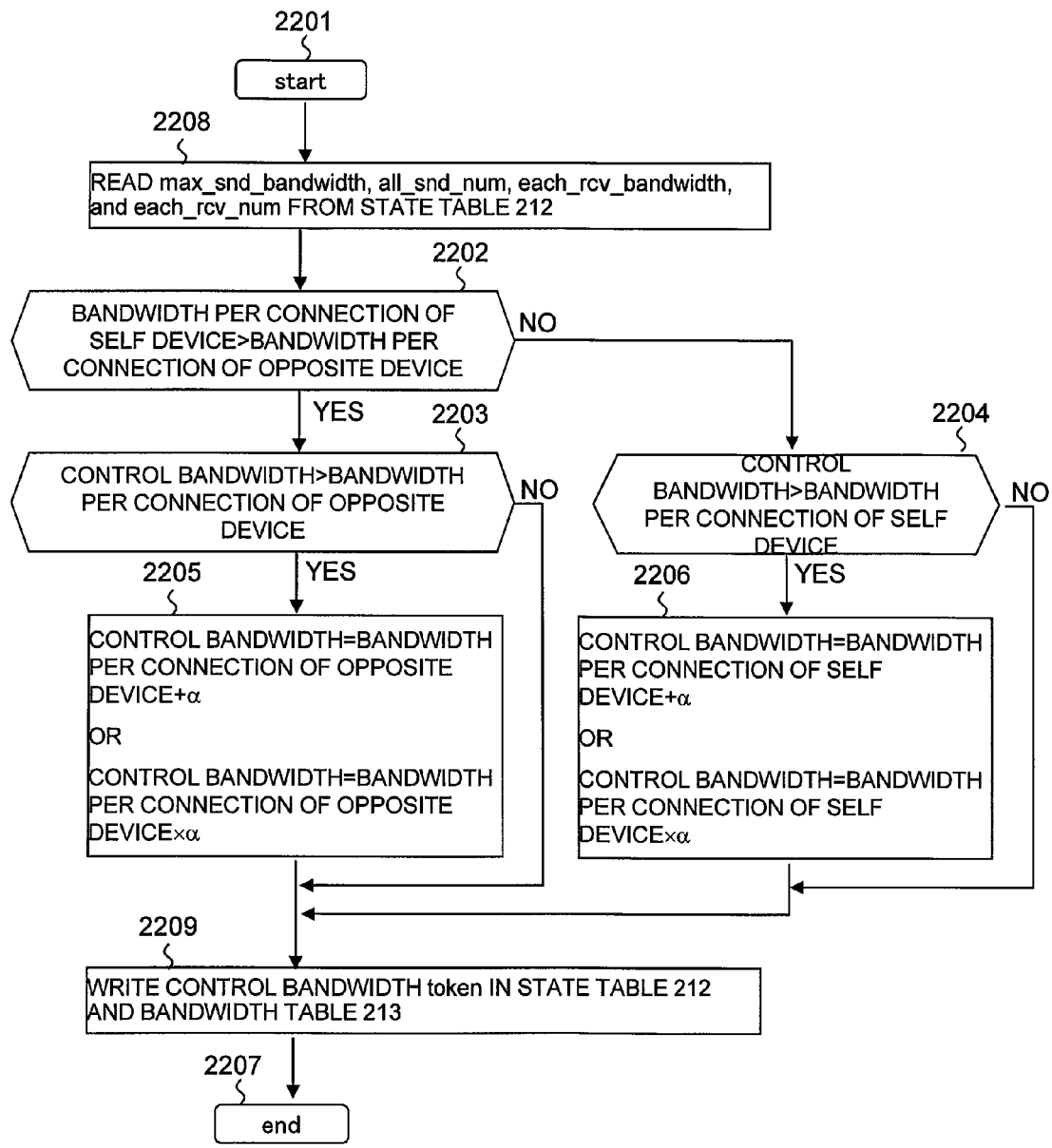
FIG. 22 This is a flowchart diagram illustrating a process of limiting a control bandwidth on the basis of a bandwidth per connection of the self device and the opposite device.

FIG. 22 is a flowchart illustrating a detailed example of the process in step 1305 or 1315. Each step of FIG. 22 is performed by the transmission bandwidth control portion 715.

When the process starts (step 2201), information of the transmission access line bandwidth max_snd_bandwidth 539 of the device 1111, the number all_snd_num. 536 of TCP connections in which data transmission is in progress in the device 1111, the reception access line bandwidth each_rcv_bandwidth 542 of the opposite device, and the number each_rcv_num 541 of TCP connections in which data reception is in progress in the opposite device is read from the state table 212 (step 2208). It is determined whether or not a transmission access line bandwidth per connection obtained by dividing the transmission access line bandwidth max_snd_bandwidth 539 of the device 1111 by the number all_snd_num 536 of TCP connections in which data transmission is in progress in the device 1111 is larger than a reception access line bandwidth per connection obtained by dividing the reception access line bandwidth each_rcv_bandwidth 542 of the opposite device by the number each_rcv_num 541 of TCP connections in which data reception is in progress in the opposite device (step 2202). If the transmission access line bandwidth per connection is larger than the reception access line bandwidth per connection, it is determined whether or not the control bandwidth (after the reference time point) token is larger than the reception access line bandwidth per connection of the opposite device (step 2203). If the transmission access line bandwidth per connection is larger than the reception access line bandwidth per connection, the control bandwidth (after the reference time point) token is changed to α value obtained by adding an integer a to the reception access line bandwidth per connection of the opposite device or by multiplying the reception access line bandwidth per connection of the opposite device by the integer α (step 2205). A value of a may be 1 or other values. If it is determined that the control bandwidth is not larger than the reception access line bandwidth per connection in step 2203, no process is performed, and the process finishes (step 2207).

On the other hand, if it is determined that the transmission access line bandwidth per connection obtained is not larger than the reception access line bandwidth per connection in step S2202, it is determined whether or not the control bandwidth (after the reference time point) token is larger than the transmission access line bandwidth per connection of the self device (step 2204). If the control bandwidth is larger than the transmission access line bandwidth per connection, the control bandwidth (after the reference time point) token is changed to a value obtained by adding an integer α to the transmission access line bandwidth per connection of the self device or by multiplying the transmission access line bandwidth per connection of the self device by the integer α (step 2206). In addition, if it is determined that the control bandwidth is not larger than the transmission access line bandwidth per connection in step 2204, no process is performed, and the process finishes (step 2207). Further, the control bandwidth token is written in the state table 212 and the bandwidth table 213 (step 2209). In addition, if otherwise is determined in steps 2203 and 2204, step 2209 may be omitted, and the process may finish.

As above, it is possible to more fairly limit a bandwidth and to realize bandwidth control based on a retransmission ratio by using not only a bandwidth per connection of the self device obtained from a transmission access line bandwidth of the self device and the number of connections in which data transmission is in progress, but also a bandwidth per connection of the opposite device obtained from a reception access line bandwidth of which the opposite device notifies and the number of connections in which data reception is in progress.

According to the method in which the above-described transmission bandwidth control portion 715 updates a control bandwidth, it is possible to control a bandwidth through a combination of the method of controlling a bandwidth by using a rate of change of a retransmission ratio based on a transmission bandwidth in the past and the most recent retransmission bandwidth, and the method of controlling a bandwidth by using information of the number of connections exchanged between the devices. Thereby, the control bandwidth is updated to more than or less than the vicinity of an available bandwidth, and thus almost the overall available bandwidth can be used. Further, it is possible to realize communication which is not dependent on an RTT or a discarding rate even between terminals which can perform only standard TCP communication.

(Operation Example)

Figure 14:
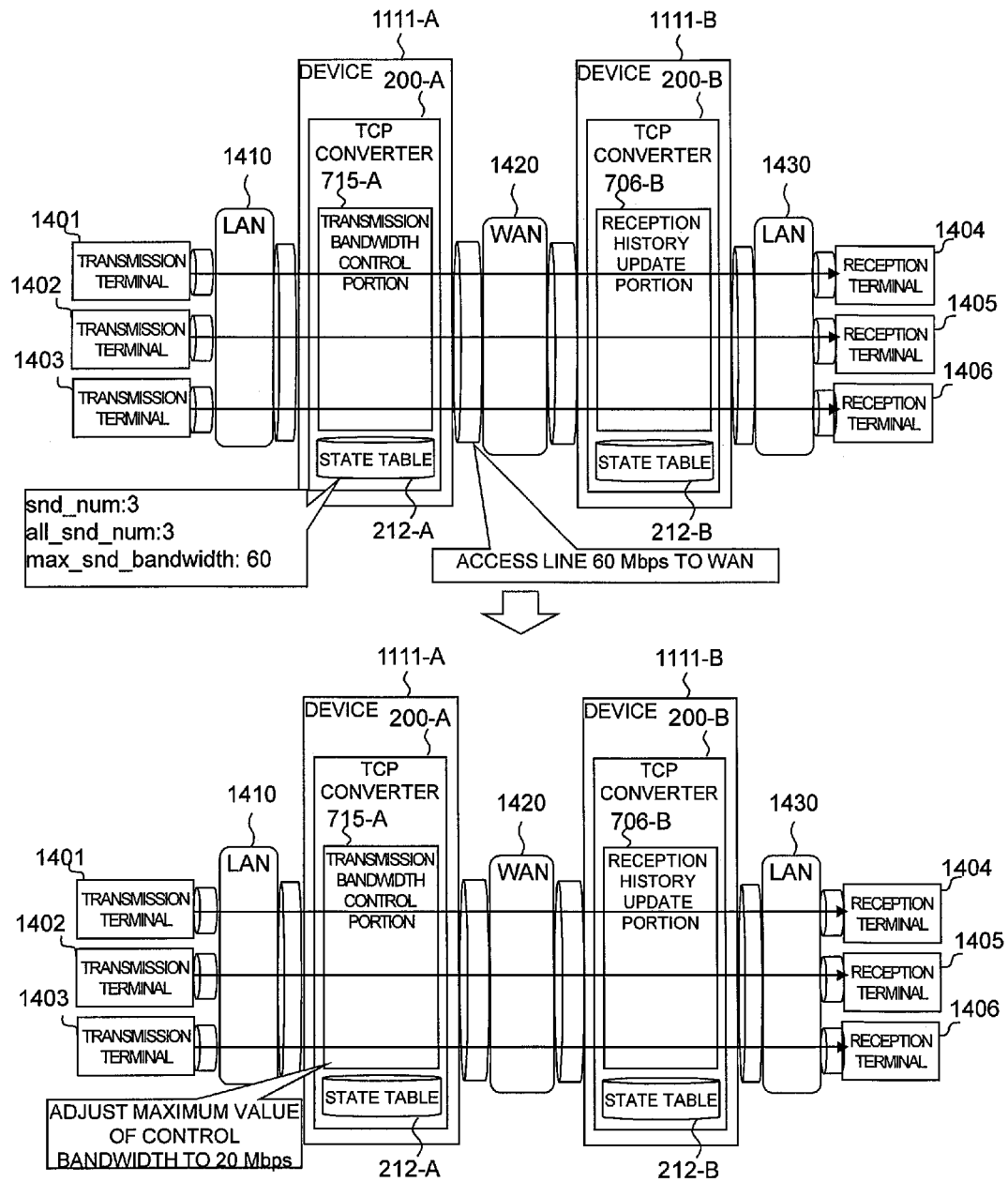
FIG. 14 This is a conceptual diagram illustrating that a device 1111-A including a single card controls a bandwidth based on statistical information of the self device.

FIG. 14 is a conceptual diagram illustrating an example of performing bandwidth control on the basis of statistical information of the self device between the device 1111-A including a single TCP converter 200 and the device 1111-B including a single TCP converter 200.

A transmission access line of the device 1111-A is set to 60 Mbps, and three TCP communications are performed from three transmission terminals (1401 to 1403) to three reception terminals (1404 to 1406) via the device 1111-A and the device 1111-B.

In the state table 212-A of the TCP converter 200-A of the device 1111-A, snd_num=3, all_snd_num=3, and max_snd_bandwidth=60 Mbps are recorded. The transmission bandwidth control portion 715-A of the TCP converter 200-A calculates a bandwidth per connection of the TCP communication which can be fairly assigned as 20 Mbps by using this information. The transmission bandwidth control portion 715-A determines a control bandwidth token on the basis of a retransmission ratio (corresponding to steps 1302 to 1304), and, if the control bandwidth token exceeds 20 Mbps, the control bandwidth is limited such that the control bandwidth token is equal to or less than 20 Mbps (corresponding to step 1305).

Figure 15:
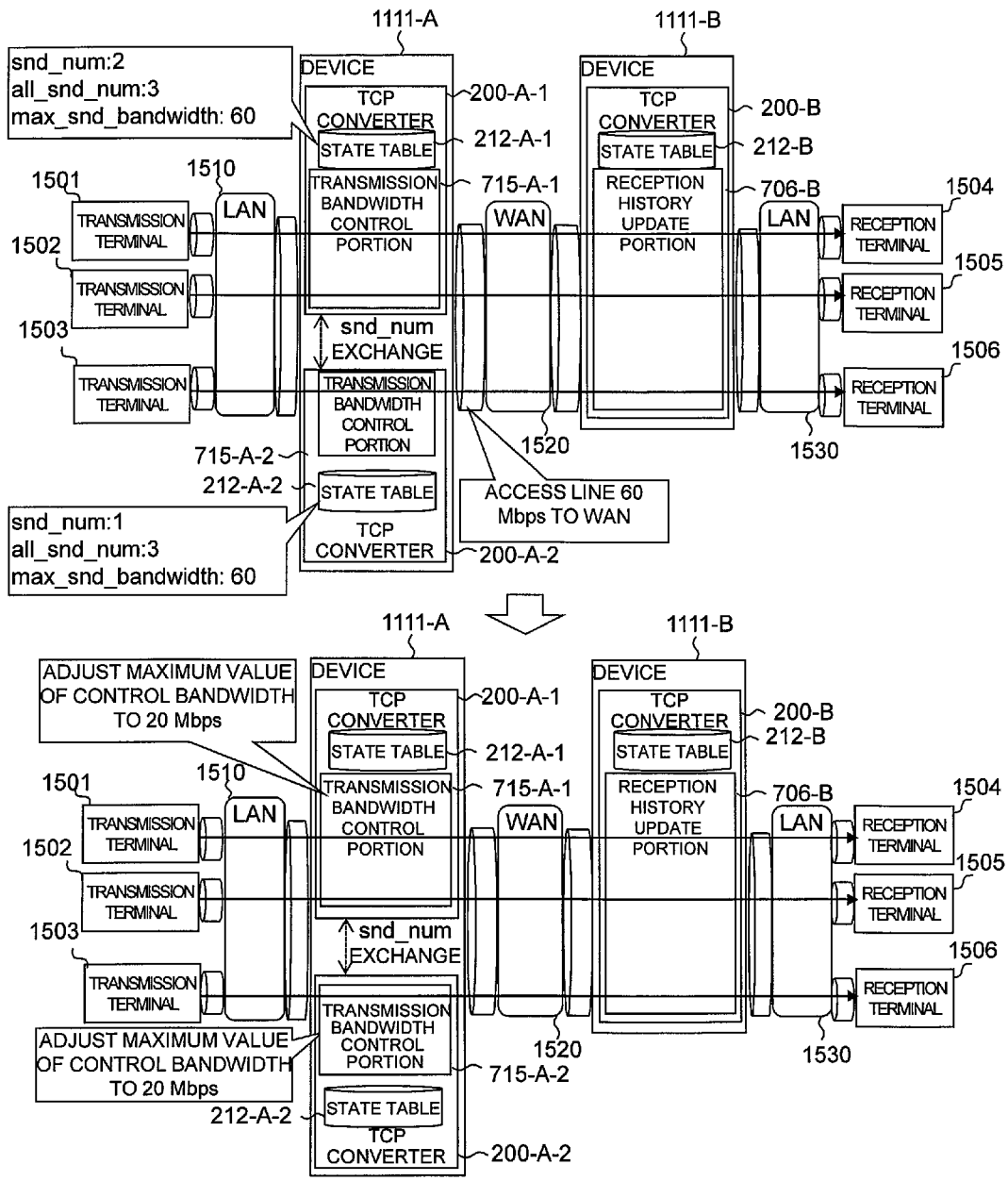
FIG. 15 This is a conceptual diagram illustrating that the device 1111-A including a plurality of cards controls a bandwidth based on the statistical information of the self device.

FIG. 15 is a conceptual diagram illustrating an example of performing bandwidth control on the basis of statistical information of the self device between the device 1111-A including a plurality of TCP converters 200 and the device 1111-B including a single TCP converter 200.

A transmission access line of the device 1111-A is set to 60 Mbps, and three TCP communications are performed from three transmission terminals (1501 to 1503) to three reception terminals (1504 to 1506) via the device 1111-A and the device 1111-B. The two TCP communications are performed via the first TCP converter 200-A-1, and the other TCP communication is performed via the second TCP converter 200-A-2.

In the state table 212-A-1 of the TCP converter 200-A-1 of the device 1111-A, snd_num=2, all_snd_num=3, and max_snd_bandwidth=60 Mbps are recorded. The transmission bandwidth control portion 715-A-1 of the TCP converter 200-A-1 calculates a bandwidth per connection of the TCP communication which can be fairly assigned as 20 Mbps by using this information. The transmission bandwidth control portion 715-A-1 determines a control bandwidth token on the basis of a retransmission ratio (corresponding to steps 1302 to 1304), and, if the control bandwidth token exceeds 20 Mbps, the control bandwidth is limited such that the control bandwidth token is equal to or less than 20 Mbps (corresponding to step 1305).

In the state table 212-A-1 of the TCP converter 200-A-2 of the device 1111-A, snd_num=1, all_snd_num=3, and max_snd_bandwidth=60 Mbps are recorded. The transmission bandwidth control portion 715-A-2 of the TCP converter 200-A-2 calculates a bandwidth per connection of the TCP communication which can be fairly assigned as 20 Mbps by using this information. The transmission bandwidth control portion 715-A-2 determines a control bandwidth token on the basis of a retransmission ratio (corresponding to steps 1302 to 1304), and, if the control bandwidth token exceeds 20 Mbps, the control bandwidth is limited such that the control bandwidth token is equal to or less than 20 Mbps (corresponding to step 1305).

Figure 16:
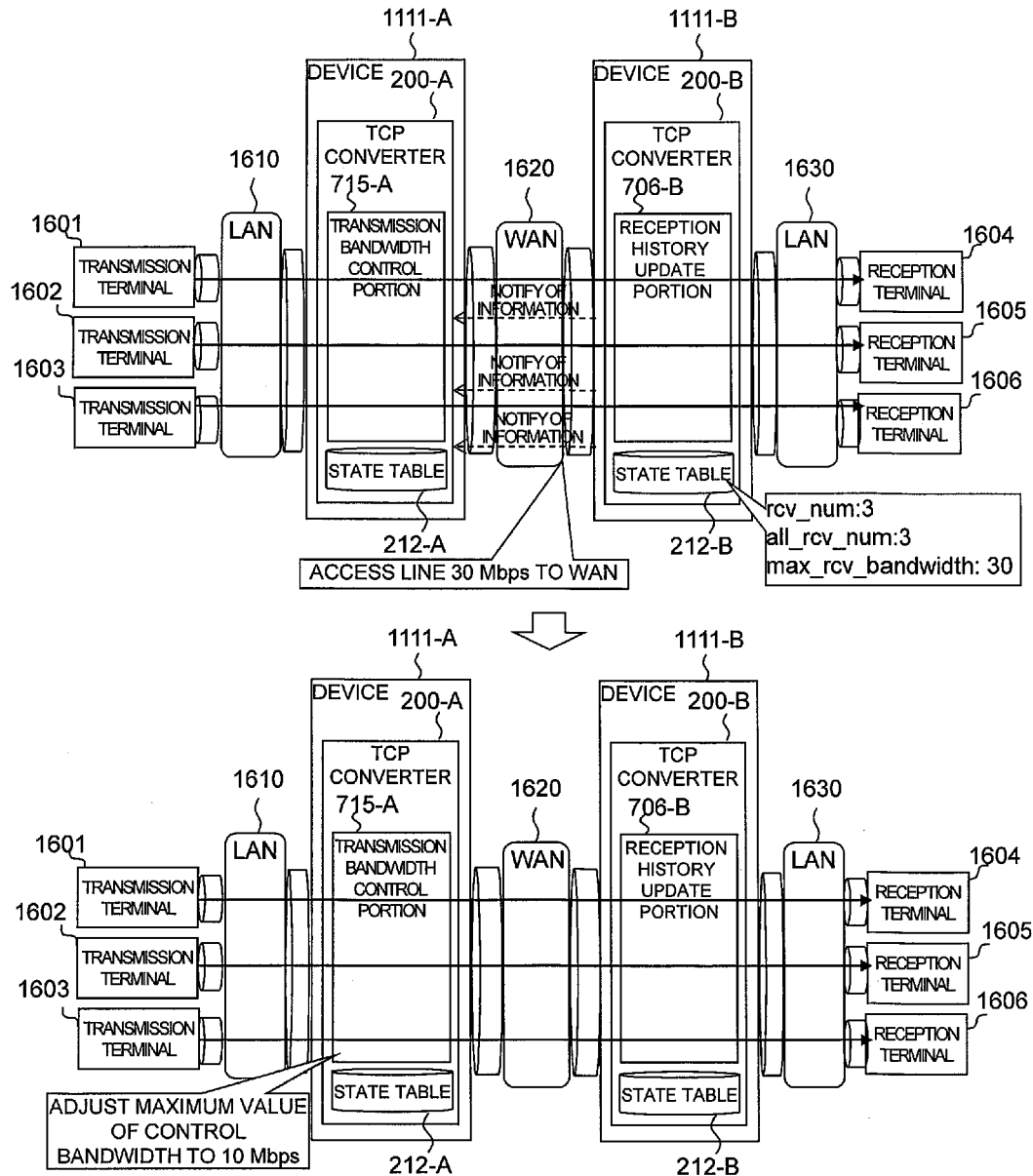
FIG. 16 This is a conceptual diagram illustrating that the device 1111-A including a single card controls a bandwidth based on statistical information of an opposite device 1111-B including a single card.

FIG. 16 is a conceptual diagram illustrating an example of performing bandwidth control on the basis of statistical information of the opposite device between the device 1111-A including a single TCP converter 200 and the device 1111-B including a single TCP converter 200.

A reception access line of the device 1111-B is set to 30 Mbps, and three TCP communications are performed from three transmission terminals (1601 to 1303) to three reception terminals (1604 to 1606) via the device 1111-A and the device 1111-B.

In the state table 212-B of the TCP converter 200-B of the device 1111-B, rcv_num=3, all_rcv_num=3, and max_rcv_bandwidth=30 Mbps are recorded. This information is carried in an ACK packet or the like, and is recorded in the state table 212 of the TCP converter 200-A after a notification thereof is sent to the device 1111-A of the transmission terminals (1601 to 1603) side. Based on the sent information, the transmission bandwidth control portion 715-A of the TCP converter 200-A adjusts a control bandwidth such that the maximum value of the control bandwidth is equal to or less than 10 Mbps.

Figure 17:
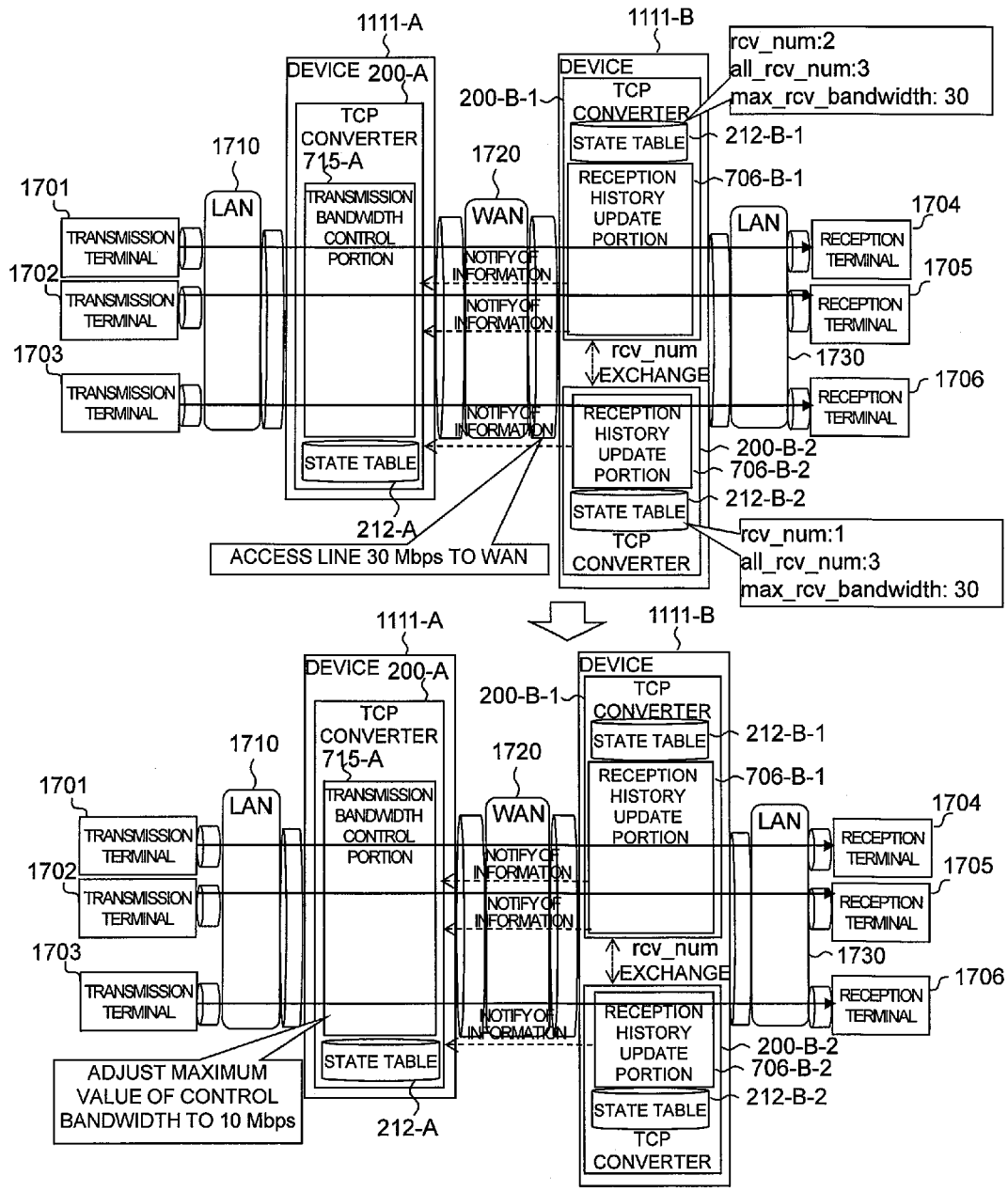
FIG. 17 This is a conceptual diagram illustrating that the device 1111-A including a single card controls a bandwidth based on the statistical information of the opposite device 1111-B including a plurality of cards.

FIG. 17 is a conceptual diagram illustrating an example of performing bandwidth control on the basis of statistical information of the opposite device between the device 1111-A including a single TCP converter 200 and the device 1111-B including a plurality of TCP converters 200.

A reception access line of the device 1111-B is set to 30 Mbps, and three TCP communications are performed from three transmission terminals (1701 to 1703) to three reception terminals (1704 to 1706) via the device 1111-A and the device 1111-B. The two TCP communications are performed via the first TCP converter 200-B-1, and the other TCP communication is performed via the second TCP converter 200-B-2.

In the state table 212-B-1 of the TCP converter 200-B-1 of the device 1111-B, rcv_num=2, all_rcv_num=3, and max_rcv_bandwidth=30 Mbps are recorded. This information is carried in an ACK packet or the like, and is recorded in the state table 212-A after a notification thereof is sent to the device 1111-A of the transmission terminals (1701 to 1703) side. Based on the sent information, the transmission bandwidth control portion 715-A of the TCP converter 200-A adjusts a control bandwidth such that the maximum value of the control bandwidth is equal to or less than 10 Mbps.

In the state table 212-B-2 of the TCP converter 200-B-2 of the device 1111-B, rcv_num=1, all_rcv_num=3, and max_rcv_bandwidth=30 Mbps are recorded. This information is carried in an ACK packet or the like, and is recorded in the state table 212-A after a notification thereof is sent to the device 1111-A of the transmission terminals (1701 to 1703) side. Based on the sent information, the transmission bandwidth control portion 715-A of the TCP converter 200-A calculates a bandwidth per connection of the TCP communication which can be fairly assigned as 10 Mbps. The transmission bandwidth control portion 715-A determines a control bandwidth token on the basis of a retransmission ratio (corresponding to steps 1302 to 1304), and, if the control bandwidth token exceeds 10 Mbps, the control bandwidth is limited such that the control bandwidth token is equal to or less than 10 Mbps (corresponding to step 1305).

Figure 18:
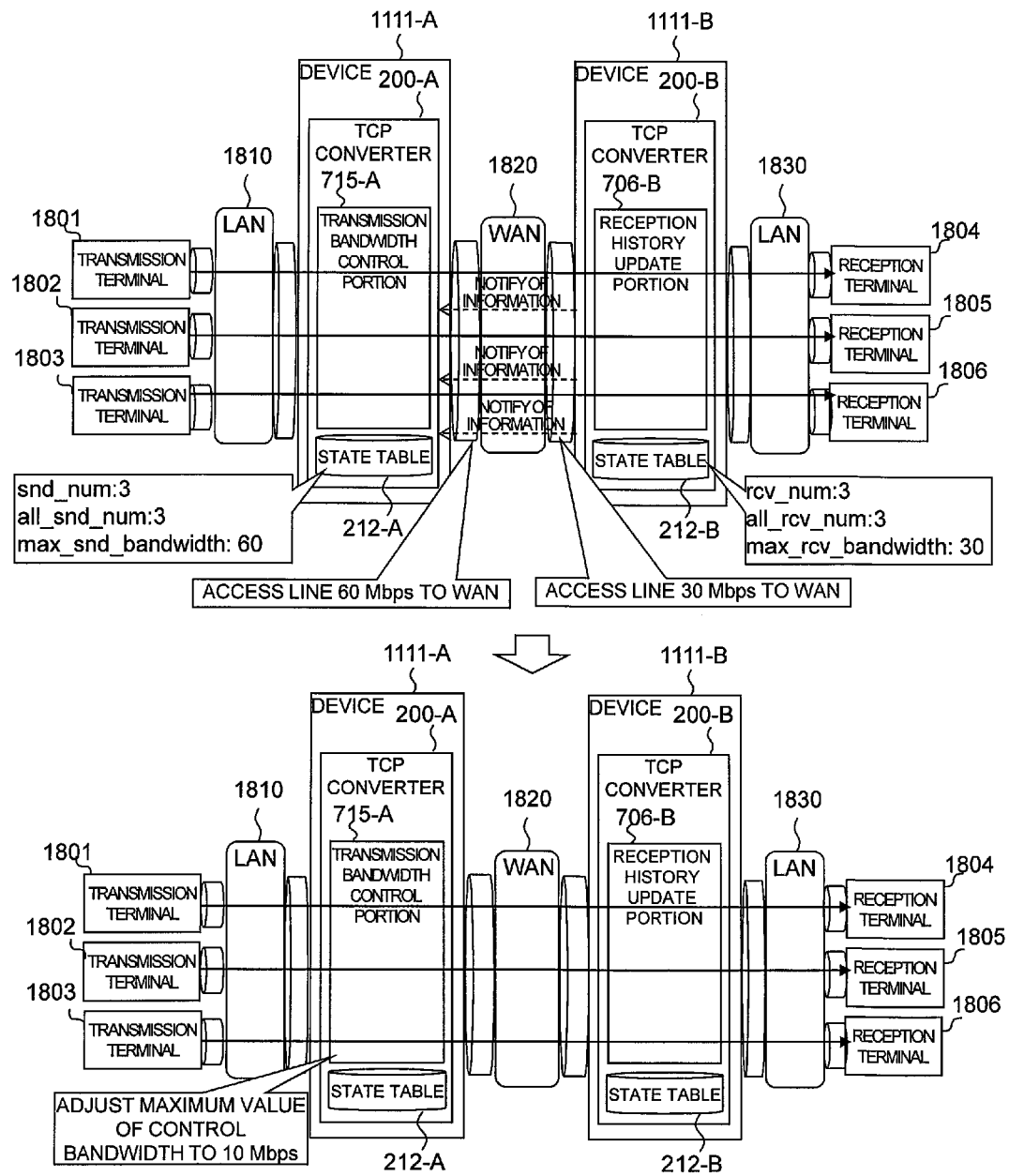
FIG. 18 This is a conceptual diagram illustrating that the device 1111-A including a single card controls a bandwidth based on the statistical information of the self device and the statistical information of the opposite device 1111-B including a single card.

FIG. 18 is a conceptual diagram illustrating an example of performing bandwidth control on the basis of statistical information of the self device and the opposite device between the device 1111-A including a single TCP converter 200 and the device 1111-B including a single TCP converter 200.

A transmission access line of the device 1111-A is set to 60 Mbps, a reception access line of the device 1111-B is set to 30 Mbps, and three TCP communications are performed from three transmission terminals (1801 to 1803) to three reception terminals (1804 to 1806) via the device 1111-A and the device 1111-B.

In the state table 212-B of the TCP converter 200-B of the device 1111-B, rcv_num=3, all_rcv_num=3, and max_rcv_bandwidth=30 Mbps are recorded. This information is carried in an ACK packet or the like, and is recorded in the state table 212-A after a notification thereof is sent to the device 1111-A of the transmission terminals (1801 to 1803) side. In the state table 212-A of the TCP converter 200-A of the device 1111-A, snd_num=3, all_snd_num=3, and max_snd_bandwidth=60 Mbps are recorded. The transmission bandwidth control portion 715-A of the TCP converter 200-A calculates a bandwidth per connection of the TCP communication which can be fairly assigned as 10 Mbps by using the information from the opposite device and the recording information in the self device. The transmission bandwidth control portion 715-A determines a control bandwidth token on the basis of a retransmission ratio (corresponding to steps 1302 to 1304), and, if the control bandwidth token exceeds 10 Mbps, the control bandwidth is limited such that the control bandwidth token is equal to or less than 10 Mbps (corresponding to step 1305).

Figure 19:
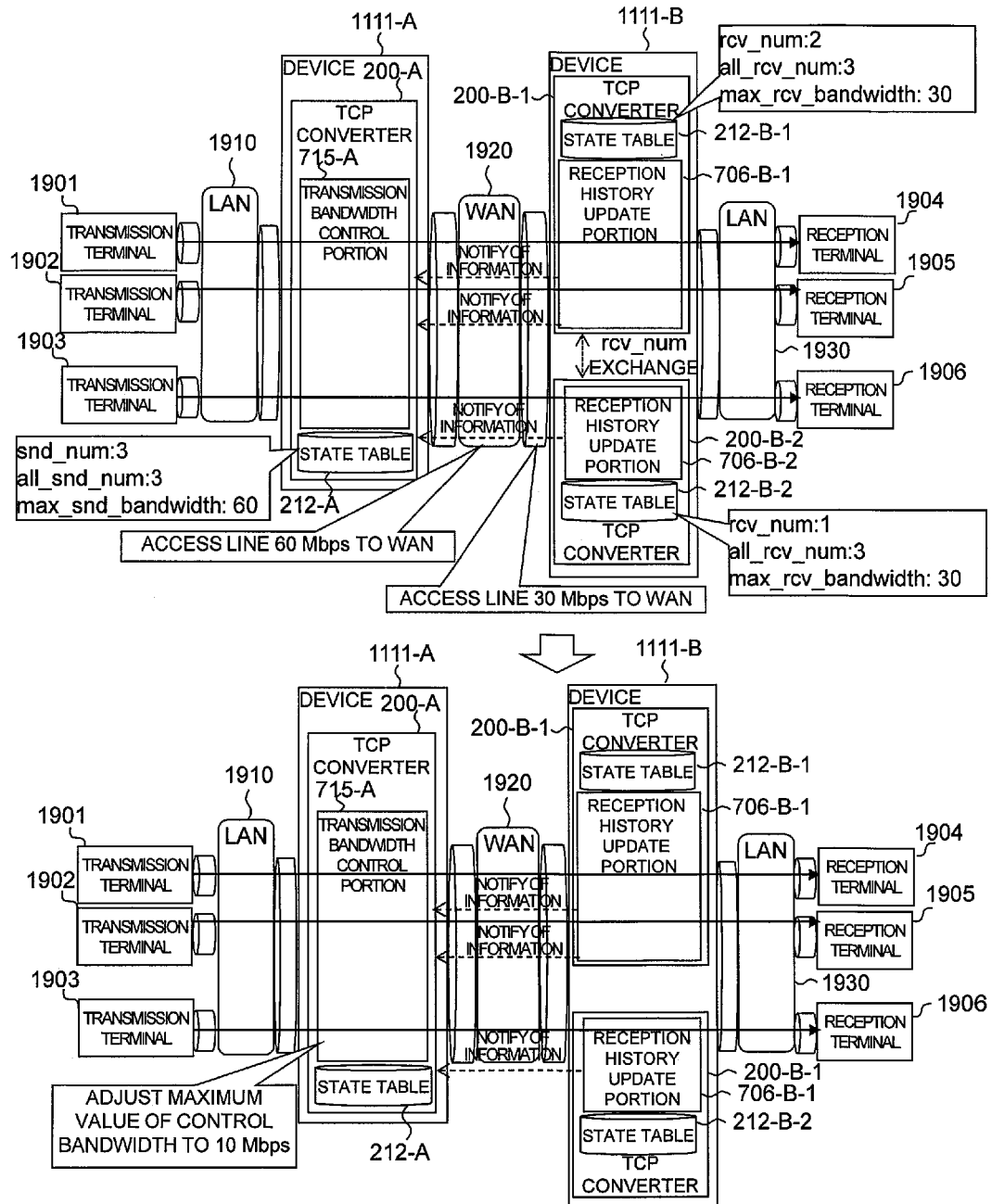
FIG. 19 This is a conceptual diagram illustrating that the device 1111-A including a single card controls a bandwidth based on the statistical information of the self device and the statistical information of the opposite device 1111-B including a plurality of cards.

FIG. 19 is a conceptual diagram illustrating an example of performing bandwidth control on the basis of statistical information of the self device and the opposite device between the device 1111-A including a single TCP converter 200 and the device 1111-B including a plurality of TCP converters 200.

A transmission access line of the device 1111-A is set to 60 Mbps, a reception access line of the device 1111-B is set to 30 Mbps, and three TCP communications are performed from three transmission terminals (1901 to 1903) to three reception terminals (1904 to 1906) via the device 1111-A and the device 1111-B. The two TCP communications are performed via the first TCP converter 200-B-1, and the other TCP communication is performed via the second TCP converter 200-B-2.

In the state table 212-B-1 of the TCP converter 200-B-1 of the device 1111-B, rcv_num=2, all_rcv_num=3, and max_rcv_bandwidth=30 Mbps are recorded. This information is carried in an ACK packet or the like, and is recorded in the state table 212-A after a notification thereof is sent to the device 1111-A of the transmission terminals (1901 to 1903) side.

In the state table 212-B-2 of the TCP converter 200-B-2 of the device 1111-B, rcv_num=1, all_rcv_num=3, and max_rcv_bandwidth=30 Mbps are recorded. This information is carried in an ACK packet or the like, and is recorded in the state table 212-A after a notification thereof is sent to the device 1111-A of the transmission terminals (1901 to 1903) side.

The transmission bandwidth control portion 715-A of the TCP converter 200-A of the device 1111-A calculates a bandwidth per connection of the TCP communication which can be fairly assigned as 10 Mbps by using the information from the opposite device and the recording information in the self device. The transmission bandwidth control portion 715-A determines a control bandwidth token on the basis of a retransmission ratio (corresponding to steps 1302 to 1304), and, if the control bandwidth token exceeds 10 Mbps, the control bandwidth is limited such that the control bandwidth token is equal to or less than 10 Mbps (corresponding to step 1305).

Figure 20:
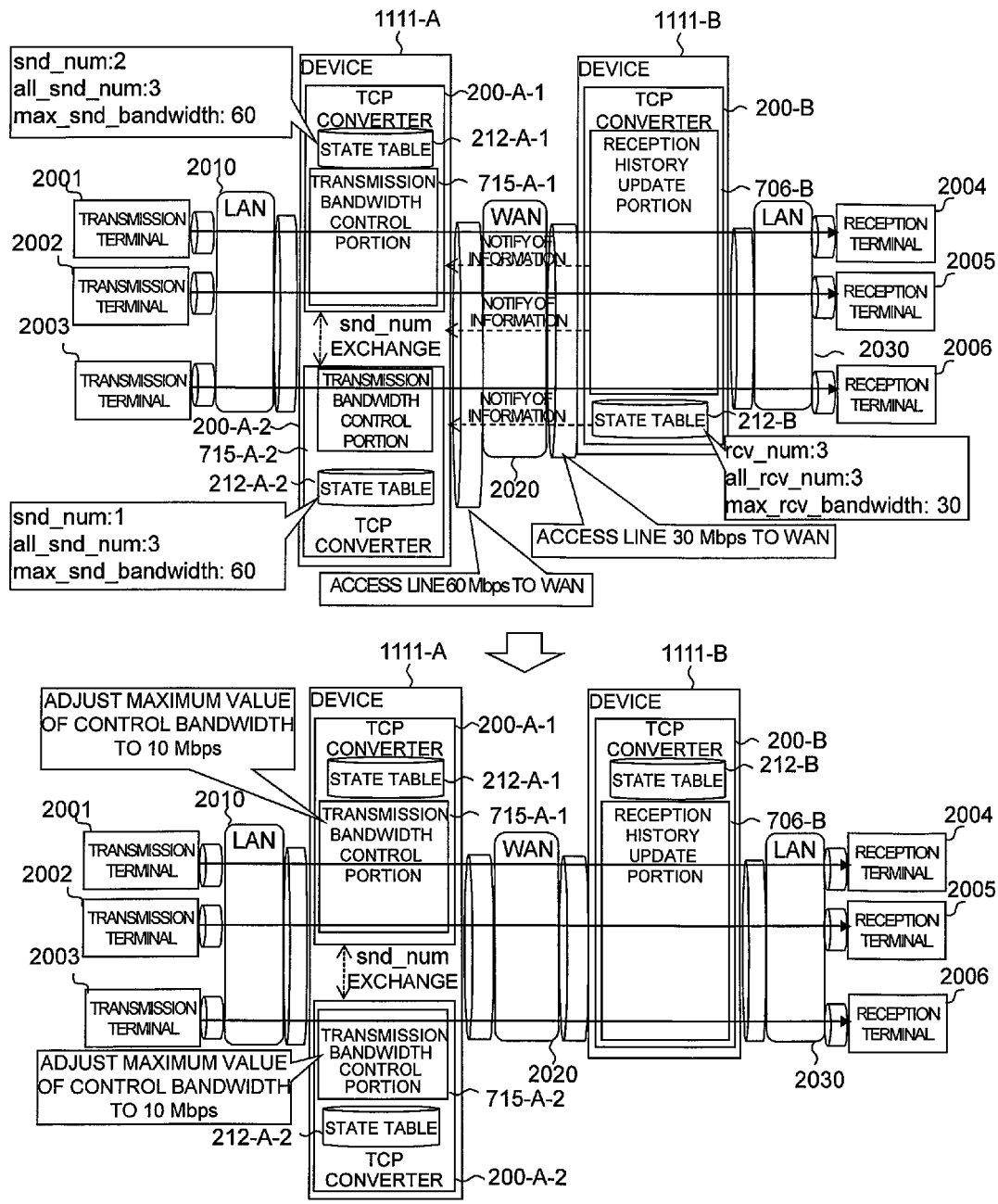
FIG. 20 This is a conceptual diagram illustrating that the device 1111-A including a plurality of cards controls a bandwidth based on the statistical information of the self device and the statistical information of the opposite device 1111-B including a single card.

FIG. 20 is a conceptual diagram illustrating an example of performing bandwidth control on the basis of statistical information of the self device and the opposite device between the device 1111-A including a plurality of TCP converters 200 and the device 1111-B including a single TCP converter 200.

A transmission access line of the device 1111-A is set to 60 Mbps, a reception access line of the device 1111-B is set to 30 Mbps, and three TCP communications are performed from three transmission terminals (2001 to 2003) to three reception terminals (2004 to 2006) via the device 1111-A and the device 1111-B. The two TCP communications are performed via the first TCP converter 200-B-1, and the other TCP communication is performed via the second TCP converter 200-B-2.

In the state table 212-B of the TCP converter 200-B of the device 1111-B, rcv_num=3, all_rcv_num=3, and max_rcv_bandwidth=30 Mbps are recorded. This information is carried in an ACK packet or the like, and is recorded in the state table 212-A-1, 212-A-2 after a notification thereof is sent to the device 1111-A of the transmission terminals (2001 to 2003) side In the state table 212-A-1 of the TCP converter 200-A-1 of the device 1111-A, snd_num=2, all_snd_num=3, and max_snd_bandwidth=60 Mbps are recorded. The transmission bandwidth control portion 715-A-1 of the TCP converter 200-A-1 of the device 1111-A calculates a bandwidth per connection of the TCP communication which can be fairly assigned as 10 Mbps by using the information from the opposite device and the recording information in the self device. The transmission bandwidth control portion 715-A-1 determines a control bandwidth token on the basis of a retransmission ratio (corresponding to steps 1302 to 1304), and, if the control bandwidth token exceeds 10 Mbps, the control bandwidth is limited such that the control bandwidth token is equal to or less than 10 Mbps (corresponding to step 1305). In the state table 212-A-2 of the TCP converter 200-A-2 of the device 1111-A, snd_num=1, all_snd_num=3, and max_snd_bandwidth=60 Mbps are recorded. The transmission bandwidth control portion 715-A-2 of the TCP converter 200-A-2 of the device 1111-A calculates a bandwidth per connection of the TCP communication which can be fairly assigned as 10 Mbps by using the information from the opposite device and the recording information in the self device. The transmission bandwidth control portion 715-A-2 determines a control bandwidth token on the basis of a retransmission ratio (corresponding to steps 1302 to 1304), and, if the control bandwidth token exceeds 10 Mbps, the control bandwidth is limited such that the control bandwidth token is equal to or less than 10 Mbps (corresponding to step 1305).

Figure 21:
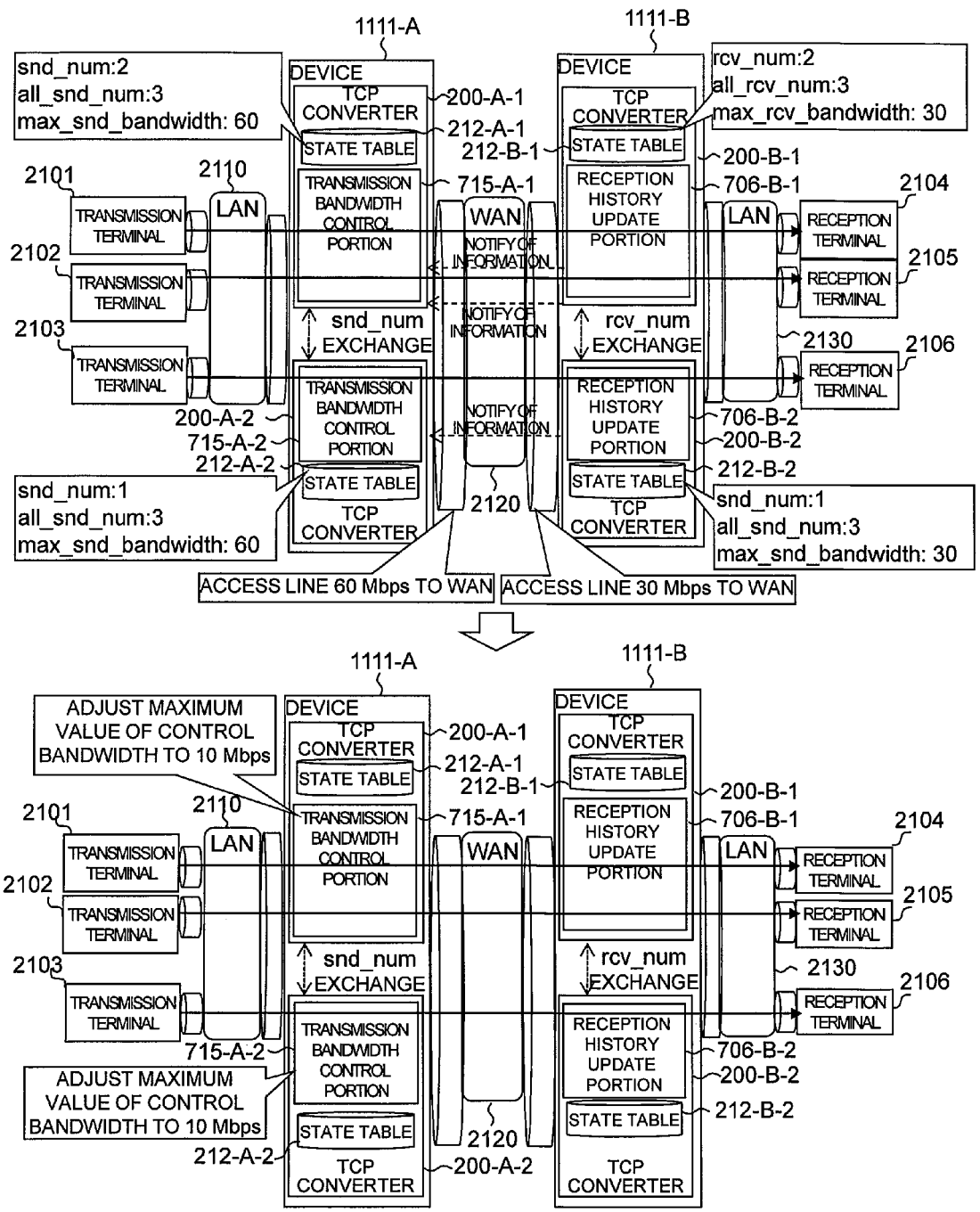
FIG. 21 This is a conceptual diagram illustrating that the device 1111-A including a plurality of cards controls a bandwidth based on the statistical information of the self device and the statistical information of the opposite device 1111-B including a plurality of cards.

FIG. 21 is a conceptual diagram illustrating an example of performing bandwidth control on the basis of statistical information of the self device and the opposite device between the device 1111-A including a plurality of TCP converters 200 and the device 1111-B including a plurality of TCP converters 200.

A transmission access line of the device 1111-A is set to 60 Mbps, a reception access line of the device 1111-B is set to 30 Mbps, and three TCP communications are performed from three transmission terminals (2101 to 2103) to three reception terminals (2104 to 2106) via the device 1111-A and the device 1111-B. The two TCP communications are performed via the first TCP converter 200-A-1 and TCP converter 200-B-1, and the other TCP communication is performed via the second TCP converter 200-A-2 and TCP converter 200-B-2.

In the state table 212-B-1 of the TCP converter 200-B-1 of the device 1111-B, rcv_num=2, all_rcv_num=3, and max_rcv_bandwidth=30 Mbps are recorded. This information is carried in an ACK packet or the like, and is recorded in the state table 212-A-1 after a notification thereof is sent to the device 1111-A (for example, a opposite TCP converter 200-A-1 in the TCP communication) of the transmission terminals (2101 to 2103) side. In the state table 212-B-2 of the TCP converter 200-B-2 of the device 1111-B, rcv_num=1, all_rcv_num=3, and max_rcv_bandwidth=30 Mbps are recorded. This information is carried in an ACK packet or the like, and is recorded in the state table 212-A-2 after a notification thereof is sent to the device 1111-A (for example, a opposite TCP converter 200-A-2 in the TCP communication) of the transmission terminals (2101 to 2103) side.

In the state table 212-A-1 of the TCP converter 200-A-1 of the device 1111-A, snd_num=2, all_snd_num=3, and max_snd_bandwidth=60 Mbps are recorded. The transmission bandwidth control portion 715-A-1 of the TCP converter 200-A-1 of the device 1111-A calculates a bandwidth per connection of the TCP communication which can be fairly assigned as 10 Mbps by using the information from the opposite device and the recording information in the self device. The transmission bandwidth control portion 715-A-1 determines a control bandwidth token on the basis of a retransmission ratio (corresponding to steps 1302 to 1304), and, if the control bandwidth token exceeds 10 Mbps, the control bandwidth is limited such that the control bandwidth token is equal to or less than 10 Mbps (corresponding to step 1305).

In the state table 212-A-2 of the TCP converter 200-A-2 of the device 1111-A, snd_num=1, all_snd_num=3, and max_snd_bandwidth=60 Mbps are recorded. The transmission bandwidth control portion 715-A-2 of the TCP converter 200-A-2 of the device 1111-A calculates a bandwidth per connection of the TCP communication which can be fairly assigned as 10 Mbps by using the information from the opposite device and the recording information in the self device. The transmission bandwidth control portion 715-A-2 determines a control bandwidth token on the basis of a retransmission ratio (corresponding to steps 1302 to 1304), and, if the control bandwidth token exceeds 10 Mbps, the control bandwidth is limited such that the control bandwidth token is equal to or less than 10 Mbps (corresponding to step 1305).

In addition, the terminal 1121 connected to the device 1111 reads information such as snd_num, all_snd_num, max_snd_bandwidth, rcv_num, all_rcv_num, max_rcv_bandwidth, each_rcv_bandwidth, and each_rcv_num of the state table 212 of each TCP converter 200 of the device 1111 and displays the information on an external device, and thereby it is possible to display a bandwidth for each TCP connection, display the number of TCP connections accommodated in the device, or display information of an access bandwidth of the opposite device or the number of TCP connections.

According to the method in which the above-described transmission bandwidth control portion 715 updates a control bandwidth, it is possible to control a bandwidth through a combination of the method of controlling a bandwidth by using a rate of change of a retransmission ratio based on a transmission bandwidth in the past and the most recent retransmission bandwidth, and the method of controlling a bandwidth by using information of the number of connections exchanged between the devices. Thereby, the control bandwidth is updated to more than or less than the vicinity of an available bandwidth, and thus almost the overall available bandwidth can be used.

Embodiment 2

Figure 23:
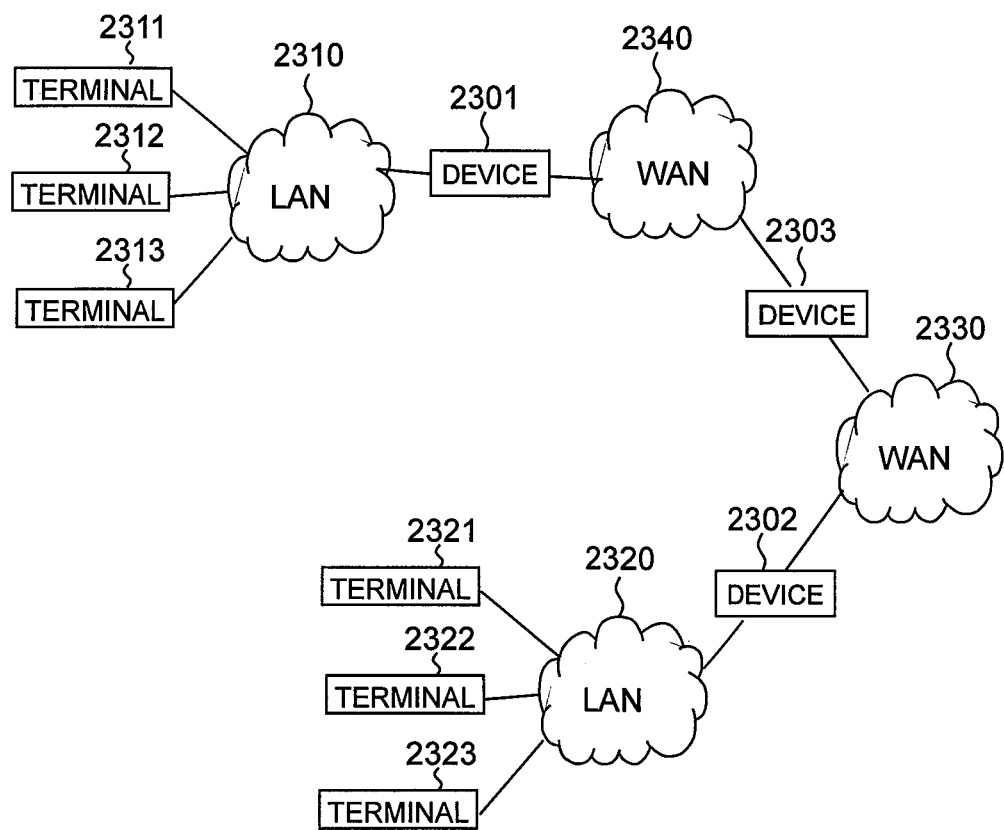
FIG. 23 This is a system configuration diagram in a case (Embodiment 2) of including a device 2303 which relays between two WANs (2340 and 2330).

FIG. 23 is a diagram illustrating a system configuration including a device 2303 relaying two WANs (2340 and 2330).

As devices 2301 and 2302, the same communication device as in Embodiment 1 is used. The device 2301 is connected to a LAN 2310 which is connected to terminals (2311 to 2313), and the WAN 2340. The device 2302 is connected to a LAN 2320 which is connected to terminals (2321 to 2323), and the WAN 2330. The communication device (hereinafter, simply referred to as a device) 2303 is connected to the WAN 2340 and the WAN 2330.

The device 2303 has the same configuration as in the block diagram shown in FIG. 11. The LAN in FIG. 11 is changed to a WAN.

Figure 24:
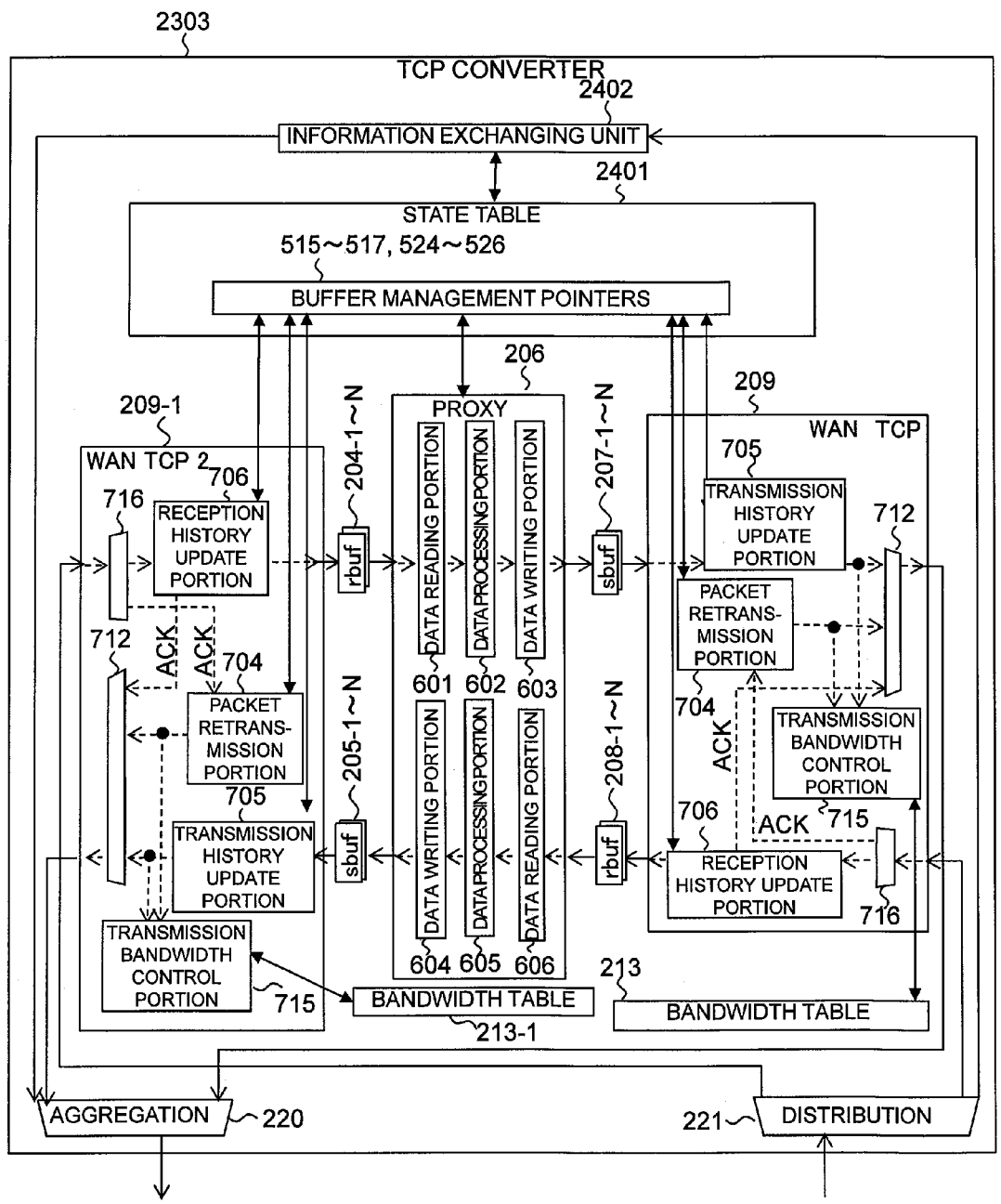
FIG. 24 This is a block diagram of a TCP converter in the device 2303 in Embodiment 2.

FIG. 24 is a block diagram of a TCP converter of the device 2303.

Upon comparison with the configuration of FIG. 2, in the device 2303, the LAN TCP block 203 is replaced with a WAN TCP block 209-1. In addition, a second bandwidth table 213-1 is provided, and thus two bandwidth tables 213 are included. A configuration of the WAN TCP processor 209-1 is the same as that of the WAN TCP processor 209. The above-described update process of a control bandwidth is performed in both of the WAN 2340 side and the WAN 2330 side.

Figure 25:
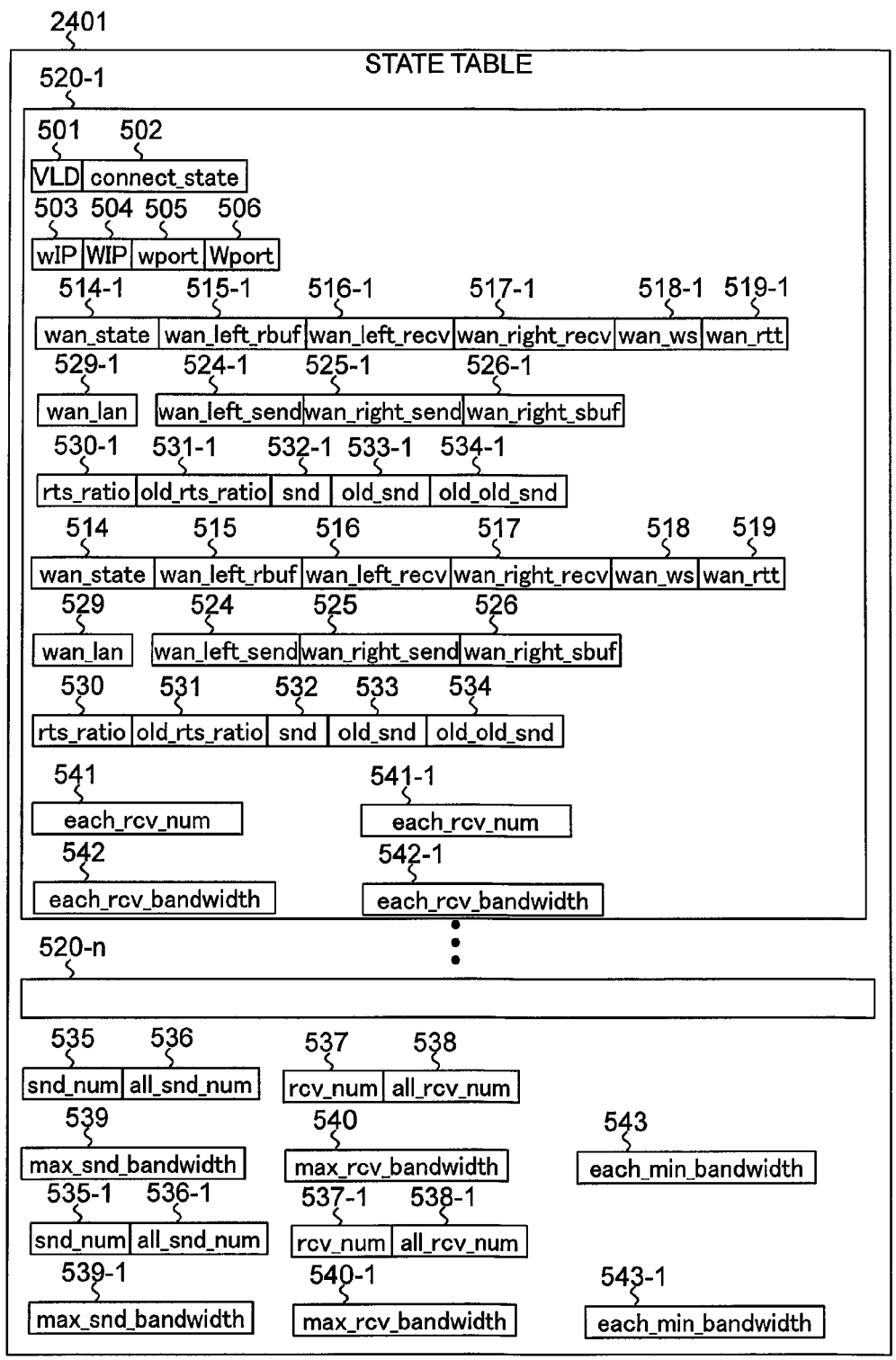
FIG. 25 This is a diagram illustrating a format of a state table 2401 in Embodiment 2.

FIG. 25 shows a format of a state table 2401.

The state table 2401 includes no LAN management information and thus two sets of WAN management information.

The state table 2401 includes n entries 520 for recording a state for each TCP connection, max_snd_bandwidth (539, 539-1) for recording a transmission access line bandwidth for each WAN of the device 2303, max_rcv_bandwidth (540, 540-1) for recording a reception access line bandwidth for each WAN of the device 2303, all_snd_num (536, 536-1) for recording the number of TCP connections in which transmission of data items is in progress to each WAN in the device 2303, all_rcv_num (538, 538-1) for recording the number of TCP connections in which reception of data items is in progress from each WAN in the device 2303, snd_num (535, 535-1) for recording the number of TCP connections in which transmission of data is in progress in each TCP converter 200 to each WAN, rcv_num (537, 537-1) for recording the number of TCP connections in which reception of data is in progress in each TCP converter 200 from each WAN, and each_min_bandwidth (543, 543-1) for recording the minimum bandwidth of each TCP connection for each WAN.

Each entry 520 includes information of each WAN. For example, each entry 520 includes VLD 501 describing whether or not an entry is used, connect_state 502 describing whether or not a connection is established, WIP 504 indicating an IP address of a terminal of the WAN side, wIP 503 indicating an IP address of a terminal of another WAN side, Wport 506 indicating a TCP port number of a terminal of the WAN side, wport 505 indicating a TCP port number of a terminal of another WAN side, wan_state (514, 514-1) indicating a TCP communication state of each WAN side, wan_left_rbuf (515, 515-1), wan_left_recv (516, 516-1), and wan_right_recv (517, 517-1) indicating pointers for managing the reception buffers of each WAN side, wan_ws (518, 518-1) indicating a value of a window scale option of each WAN side, wan_rtt (519, 519-1) indicating an average RTT of each WAN side, wan_lan (529, 529-1) indicating the size of data which is read from the reception buffer of each WAN side and on which processing is in progress, wan_left_send (524, 524-1), wan_right_send (525, 525-1), and wan_right_sbuf (526, 526-1) indicating pointers for managing the transmission buffers of each WAN side, rts_ratio (530, 530-1) indicating the most recent retransmission ratio of each WAN side, old_rts_snd (531, 531-1) indicating a retransmission bandwidth in the past of each WAN side, snd (532, 532-1) indicating the most recent transmission bandwidth of each WAN side, old_snd (533, 533-1) indicating a transmission bandwidth in the past of each WAN side, old_old_snd (534, 534-1) indicating a transmission bandwidth further in the past of each WAN side, each_rcv_num (541, 541-1) for recording the number of connections in which data reception is in progress in the opposite device of each WAN side, and each_rcv_bandwidth (542, 542-1) for recording a reception access line bandwidth of the opposite device of each WAN side.

each_rcv_num (541, 541-1) and each_rcv_bandwidth (542, 542-1) are updated based on information of which the opposite device notifies. The packet retransmission portion 704 updates them for each TCP connection by using a value or the like described in the TCP option field of an ACK packet transmitted by the opposite device.

max_snd_bandwidth (539, 539-1), max_rcv_bandwidth (540, 540-1), or the like is updated manually through the terminal 1121 or the like.

snd_num (535, 535-1) or rcv_num (537, 537-1) is exchanged for each WAN by the information exchanging unit 2402. The information exchanging unit 2402 checks a buffer accumulation amount for each entry of the state table 212, determines an entry in which data is accumulated in the transmission buffer as being a connection in which data transmission is in progress and determines an entry in which data is accumulated in the reception buffer as being a connection in which data reception is in progress, and calculates snd_num (535, 535-1) or rcv_num (537, 537-1) by integrating the number of connections.

all_rcv_num (538, 538-1) and all_snd_num (536, 536-1) are updated based on information exchange with all the other TCP converters 200 in the device 2303. The information exchanging unit 2402 of the TCP converter 200 notifies all the other TCP converters 200 of snd_num (535, 535-1) or rcv_num (537, 537-1) for each WAN. In addition, a total value of snd_num (535, 535-1) or rcv_num (537, 537-1) of which all the other TCP converters 200 notify is calculated for each WAN, so as to obtain and periodically update all_rcv_num (538, 538-1) and all_snd_num (536, 536-1) for each WAN.

The device 2303 operates independently with respect to each WAN, and independently performs information exchange in each WAN, thereby realizing the function as in Embodiment 1 in the device relaying two WANs as well.

Embodiment 3

The present embodiment shows an example in which each TCP connection is weighted, and the number of connections is calculated.

Figure 26:
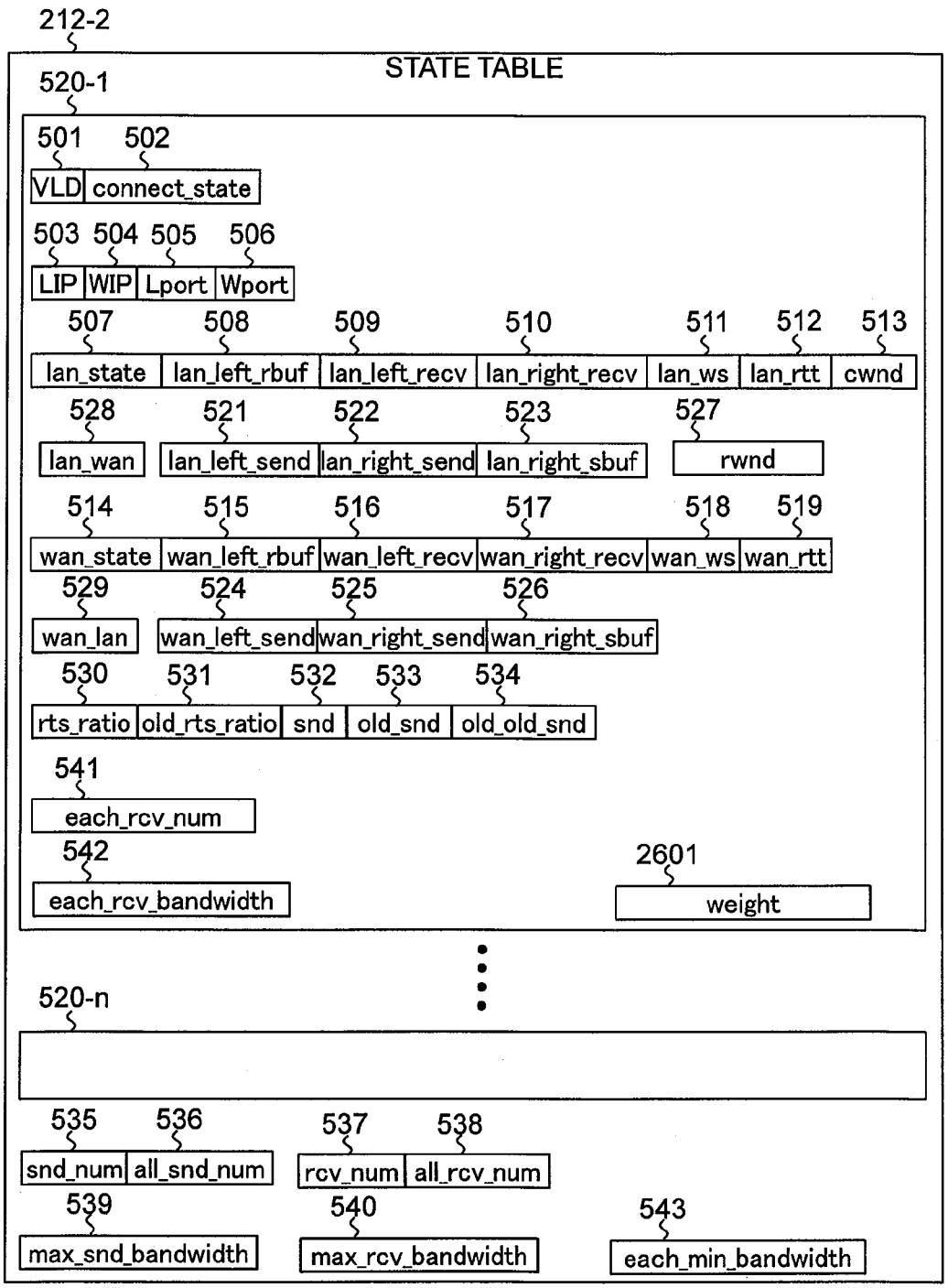
FIG. 26 This is a diagram illustrating a format of a state table 212-1 in Embodiment 3.

FIG. 26 shows a format of a state table 212-1 according to the present embodiment.

The state table 212-1 includes weight information weight 2601 added to the configuration of Embodiment 1 for each entry.

The weight information weight 2601 may be determined, for example, based on a buffer accumulation amount (a total of a difference between right_sbuf and left_send and a difference between right_recv and left_rbuf) of each connection, or based on a port number (TCP port number). In a case of performing the determination based on a port number, a weight may be designated manually in the information exchanging unit 230 for each port number from the terminal 1121 connected to the device 1111. The information exchanging unit 230 observes a port number Lport or Wport of the entry, and records the designated weight in weight 2601.

In a case of calculating a total value of the number of connections, the information exchanging unit 230 adds a value described in weight 2601 corresponding to a connection to the connection. For example, if weight 2601 is 2, 2 is added to the corresponding connection, and if weight 2601 is 0.5, 0.5 is added thereto. A total value (snd sum) of the number of connections obtained in this way is exchanged with the other TCP exchanging units 200.

In addition, when the transmission bandwidth control portion 715 obtains a bandwidth for each connection of a plurality of TCP communications of the self device, the bandwidth is obtained by multiplying a value which is obtained by dividing the transmission access line bandwidth max_snd_bandwidth 539 of the device 1111 by the number all_snd_num 536 of TCP connections in which data transmission is in progress in the device 1111, by weight 2601 of corresponding TCP communication. Further, when the transmission bandwidth control portion 715 obtains a bandwidth for each connection of a plurality of TCP communications of the opposite device, the bandwidth is obtained by multiplying a value which is obtained by dividing the reception access line bandwidth each_rcv_bandwidth 542 by the number each_rcv_num 541 of TCP connections in which data reception is in progress in the opposite device, by weight 2601 of corresponding TCP communication.

As described above, it is possible to realize the same function as in Embodiment 1 while each TCP connection is weighted, by using the number of TCP connections in which the weight information weight 2601 is reflected.

INDUSTRIAL APPLICABILITY

The present invention is applicable to, for example, a communication device which relays communication between terminals.

The invention claimed is:

1. A communication device comprising:
a plurality of cards relaying TCP communications, each of the cards including a TCP converter relaying TCP communication,
wherein each of the plural TCP converters includes
an information exchanging unit that exchanges information of the number of TCP connections in which data transmission is in progress via one of the TCP converters with another of the TCP converters of the device, and
a bandwidth control unit that defines the maximum transmission bandwidth of each TCP communication, wherein
the information exchanging unit calculates a total value of the number of TCP connections in which data transmission is in progress in the entire device on the basis of the information of the number of TCP connections exchanged among all of the plural TCP converters of the device, and
the bandwidth control unit defines the maximum transmission bandwidth of each TCP communication on the basis of the total value of the number of TCP connections in which data transmission is in progress in the entire device.

2. The communication device according to claim 1, wherein
each of the TCP converters further includes a state storage region that records the maximum transmission bandwidth of a connected line therein, and
the bandwidth control unit defines and limits the maximum transmission bandwidth of each TCP communication on the basis of the recorded maximum transmission bandwidth of the line and the total value of the number of TCP connections in which data transmission is in progress in the entire device.

3. The communication device according to claim 1, wherein
each of the TCP converters receives a total value of the number of TCP connections in which data reception is in progress in an opposite device of TCP communication, from the opposite device, and
the bandwidth control unit limits the maximum transmission bandwidth of each TCP communication on the basis of the total value of the number of TCP connections in which data transmission is in progress in the entire device and the total value of the number of TCP connections in which data reception is in progress in the opposite device, received from the opposite device.

4. The communication device according to claim 3, wherein the information exchanging unit notifies the opposite device of the calculated total value of the number of TCP connections in which data reception is in progress in the entire device.

5. The communication device according to claim 3, wherein
each of the TCP converters further includes a state storage region that records the maximum transmission bandwidth of a connected line of the device therein,
each of the TCP converters further receives the maximum reception bandwidth of the line in the opposite device, from the opposite device, and
the bandwidth control unit limits the maximum transmission bandwidth of each TCP communication on the basis of the maximum transmission bandwidth of the line recorded in the device, the total value of the number of TCP connections in which data transmission is in progress in the entire device, the maximum reception bandwidth of the line in the opposite device, received from the opposite device, and the total value of the number of TCP connections in which data reception is in progress in the opposite device, received from the opposite device.

6. The communication device according to claim 5, wherein the bandwidth control unit limits the maximum bandwidth of each TCP communication on the basis of a value obtained by dividing the maximum transmission bandwidth of the line recorded in the device by the total value of the number of TCP connections in which data transmission is in progress in the entire device, and a value obtained by dividing the maximum reception bandwidth of the line in the opposite device received from the opposite device by the total value of the number of TCP connections in which data reception is in progress in the opposite device, received from the opposite device.

7. The communication device according to claim 5, wherein
the state storage region further records the maximum reception bandwidth of a connected line, and
the information exchanging unit notifies the opposite device of the recorded maximum reception bandwidth of the line and the total value of TCP connections in which data reception is in progress in the entire self device.

8. The communication device according to claim 1, wherein the bandwidth control unit limits the maximum transmission bandwidth of each TCP communication by further using a retransmission ratio of data in each TCP communication.

9. The communication device according to claim 8, wherein the bandwidth control unit
measures a retransmission bandwidth after a reference time point and a transmission bandwidth before the reference time point in each TCP communication; and
calculates the retransmission ratio of data through division by the retransmission bandwidth after the reference time point and the transmission bandwidth before the reference time point.

10. The communication device according to claim 1, wherein the bandwidth control unit
calculates a rate of change of a retransmission ratio in each TCP communication; and
changes the maximum transmission bandwidth of each TCP communication depending on the rate of change of the retransmission ratio.

11. The communication device according to claim 10, wherein the bandwidth control unit reduces the maximum transmission bandwidth of each TCP communication according to the retransmission ratio when the rate of change of the retransmission ratio exceeds a predefined threshold value.

12. The communication device according to claim 10, wherein the bandwidth control unit increases the maximum transmission bandwidth of each TCP communication when the rate of change of the retransmission ratio does not exceed a predefined threshold value.

13. The communication device according to claim 1, further comprising:
    a transmission control unit that transmits data according to the maximum transmission bandwidth of each TCP communication.

14. The communication device according to claim 1, wherein
    a weight is set for each TCP communication, and
    a corresponding weight is added for each TCP connection so as to obtain a total value of the number of TCP connections, and the maximum transmission bandwidth is defined according to the weight.

15. The communication device according to claim 1, wherein:
    the plurality of cards relaying TCP communications relay TCP communications in which data transmission is in progress between a LAN connection and a WAN connection.

\* \* \* \* \*